(12) United States Patent
Pendharkar et al.

(10) Patent No.: US 9,292,350 B1
(45) Date of Patent: Mar. 22, 2016

(54) MANAGEMENT AND PROVISIONING OF VIRTUAL MACHINES

(75) Inventors: Niranjan S. Pendharkar, Maharashtra (IN); Venkeepuram R. Satish, Fremont, CA (US); Jaya Singhvi, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 379 days.

(21) Appl. No.: 13/327,218

(22) Filed: Dec. 15, 2011

(51) Int. Cl.
G06F 9/455 (2006.01)
G06F 9/46 (2006.01)
G06F 15/173 (2006.01)
G06F 9/50 (2006.01)

(52) U.S. Cl.
CPC ............ *G06F 9/5055* (2013.01); *G06F 9/5083* (2013.01); *G06F 2009/4557* (2013.01)

(58) Field of Classification Search
USPC .......................... 718/1; 709/220, 226; 711/162
See application file for complete search history.

(56) References Cited

U.S. PATENT DOCUMENTS

| | | | |
|---|---|---|---|
| 7,464,163 B1 * | 12/2008 | Bantz et al. .................... 709/226 |
| 2007/0271560 A1 | 11/2007 | Wahlert et al. ..................... 718/1 |
| 2008/0163207 A1 * | 7/2008 | Reumann et al. ................. 718/1 |
| 2009/0089300 A1 * | 4/2009 | Vicente ......................... 707/100 |
| 2009/0119664 A1 * | 5/2009 | Pike et al. ......................... 718/1 |
| 2009/0271784 A1 | 10/2009 | Barsness et al. .................... 718/1 |
| 2009/0282404 A1 * | 11/2009 | Khandekar et al. ............... 718/1 |
| 2010/0332657 A1 | 12/2010 | Elyashev et al. .............. 709/226 |
| 2011/0252208 A1 * | 10/2011 | Ali et al. ........................ 711/162 |
| 2012/0324445 A1 | 12/2012 | Dow et al. .......................... 718/1 |
| 2013/0111468 A1 | 5/2013 | Davis et al. ........................ 718/1 |

* cited by examiner

*Primary Examiner* — Meng An
*Assistant Examiner* — Bing Zhao
(74) *Attorney, Agent, or Firm* — Campbell Stephenson

(57) ABSTRACT

Various systems and methods for management and provisioning of virtual machines are disclosed. For example, embodiments include selecting a potential node to host a virtual machine, where the node is selected from among a plurality of potential nodes. The selection may be based on a virtual machine (VM) configuration of a virtual machine, which may include various requirements needed to host the VM. Embodiments also include provisioning the VM on the host node after the host node is selected from among the plurality of potential nodes, and determining whether a currently-hosted node are operating in accordance with various criteria needed for the VM.

40 Claims, 16 Drawing Sheets

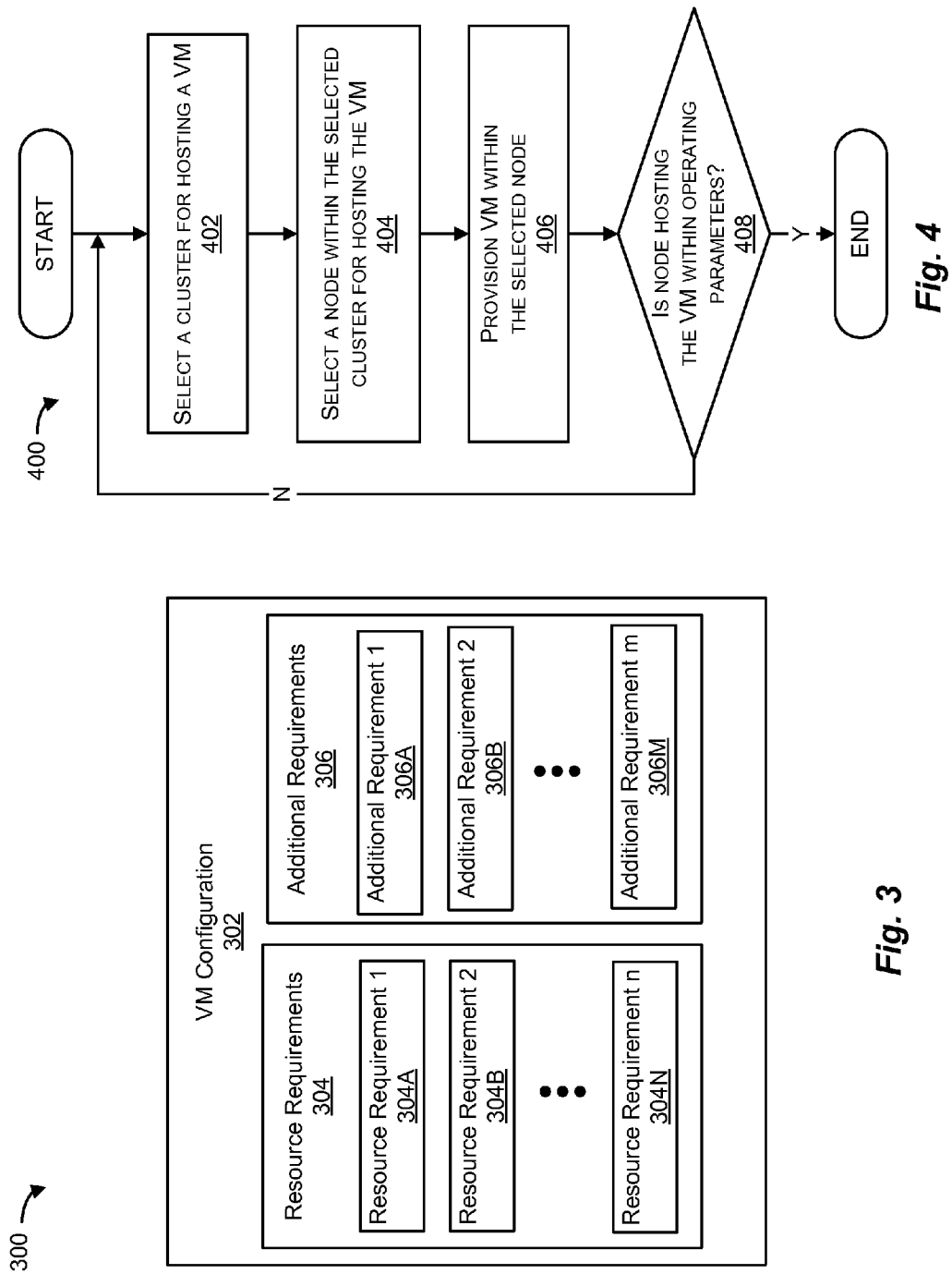

MANAGEMENT AND PROVISIONING OF VIRTUAL MACHINES

BACKGROUND OF THE INVENTION

1. Field of the Invention

This application relates to management and provisioning of virtual machines. Particularly, this application relates to managing virtual machine configuration and provisioning of virtual machines based on such virtual machine configuration.

2. Description of the Related Art

A distributed computing system can include multiple computing nodes (nodes) that communicate with and access, using a network, data stored on a shared storage device. Each such node can implement multiple virtual machines that allow increased usage of hardware resources, i.e., by using the hardware resources of each node to support multiple virtual machines. Each virtual machine (VM) can execute a separate operating system, and can be interacted with, and used in substantially the same manner as, a standalone operating system executing on independent hardware. It is desirable to be able to determine the resource needs of virtual machines, when configuring a node to host the virtual machine.

BRIEF DESCRIPTION OF THE DRAWINGS

The embodiments of the present application may be better understood, and its numerous objects, features, and advantages made apparent to those skilled in the art by referencing the accompanying drawings.

FIG. 3 is a block diagram illustrating various components of a virtual machine configuration, according to one embodiment.

FIG. 4 is a flowchart illustrating a method for management and provisioning of virtual machines, according to one embodiment.

Figure 1:
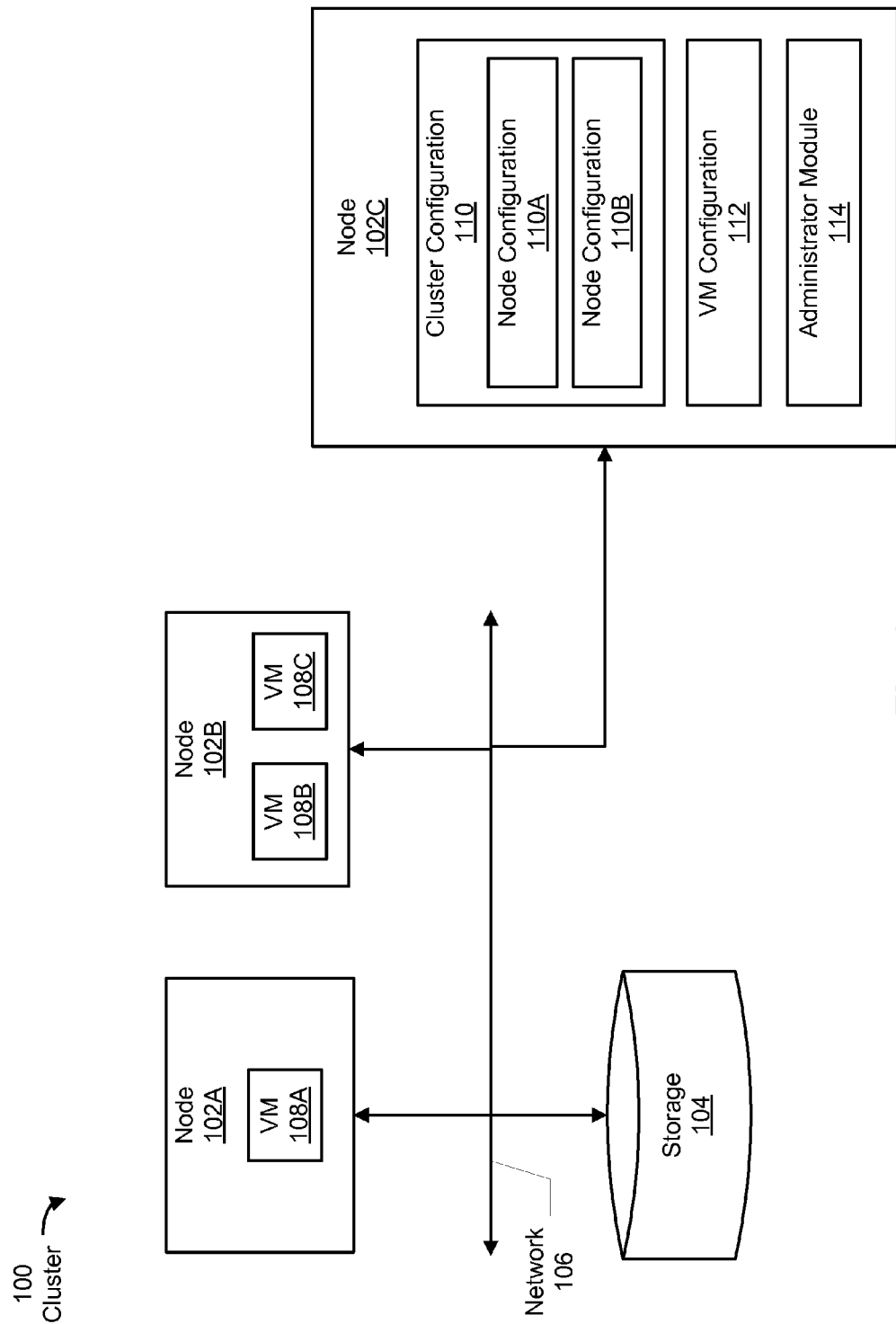
FIG. 1 is a block diagram illustrating a cluster that includes a collection of nodes and storage, according to one embodiment.

While the embodiments of the application are susceptible to various modifications and alternative forms, specific embodiments are provided as examples in the drawings and detailed description. It should be understood that the drawings and detailed description are not intended to limit the embodiments to the particular form disclosed. Instead, the intention is to cover all modifications, equivalents and alternatives falling within the spirit and scope of the invention as defined by the appended claims.

DETAILED DESCRIPTION

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

Embodiments of the present invention are directed to managing virtual machine (VM) configuration. Such VM configurations are associated both with VMs that are to be provisioned on (and so be hosted on) a node, as well with VMs that are already being hosted by such nodes. A VM configuration can include one or more resource requirements as well as one or more additional requirements. Resource requirements indicate one or more resources that are needed in a node for hosting this VM. Additional requirements indicate one or more operational elements needed in a node for hosting this VM. This VM configuration is compared to configurations of various clusters. The cluster configuration can indicate configuration information for node(s) of that cluster. This comparison can be used to select a cluster that includes nodes that can meet the resource and the additional requirements for hosting this VM.

FIG. 1 is a block diagram illustrating a cluster 100 that includes a collection of nodes and storage. Cluster, e.g., cluster 100, includes several nodes, e.g., nodes 102A, 102B, and 103C. Each node can communicate with storage, e.g., storage 104, using a network, e.g., network 106. Although only three nodes 102A-102C are shown, cluster 100 may include a different number of nodes. Each such node can implement one or more virtual machines, e.g., virtual machines 108A-108C. In some embodiments, each node may implement virtual machines using hypervisor technology, although other architectures are contemplated.

A VM can be provisioned based on a service level agreement (SLA) associated with that VM. An SLA can include various resource requirements such as physical requirements of a node where that VM is provisioned. These resource requirements can include CPU, memory, and other hardware requirements. As a result, the VM is provisioned on a server that has the resources specified by the resource requirements of the SLA associated with that VM.

In one embodiment, the cluster can have associated cluster configuration, e.g., cluster configuration 110. Cluster configuration can include configuration information for the cluster and/or configuration information for node(s). For example, cluster information 110 can include configuration information 110A for node 102A and configuration information 110B for node 102B. A detailed description of such configuration information is provided in connection with the examples presented in FIG. 3. It is noted that while FIG. 1 shows a single node (node C 102C) supporting such cluster configuration, this is made for illustrative purposes only, and cluster configuration 110 can be supported, implemented, accessed, and/or stored anywhere in cluster 100. For example, cluster configuration 110 can be distributed among nodes 102A and 102B of cluster 100, and/or storage 104. Cluster configuration can also be stored outside cluster 100, such as at a central repository, and be accessed via network 106, as desired.

VM configuration, such as VM configuration 112, includes resource requirement(s), and one or more additional requirement(s). It is noted that while FIG. 1 shows a single node (node C 102C) supporting such VM configuration, this is made for illustrative purposes only, and VM configuration 112 can be supported, implemented, accessed, and/or stored anywhere in cluster 100. For example, VM configuration 112 can be distributed among nodes 102A and 102B of cluster 100, and/or storage 104. VM configuration can also be stored outside cluster 100, such as at a central repository, and be accessed via network 106, as desired. In one embodiment, the VM configuration is included in the VM's service level agreement (SLA). In one embodiment, the VM configuration is associated with a VM that is not yet hosted. For example, a command can be received requesting a creation of a new VM (e.g., to be provisioned at a node) according to the VM configuration. In another embodiment, the VM configuration is associated with a VM that is already being hosted on one of nodes of a cluster. For example, a command can be received requesting that a VM be provisioned at a new node according to the VM configuration.

An SLA can include VM configuration, such as both resource requirements and additional requirements. Resource requirements such as physical requirements of a node where this VM can be provisioned. These resource requirements can include CPU, memory, and/or other hardware requirements. The resource requirement(s) indicate resource(s) needed in a node for hosting the VM. For example, these resources include various hardware requirements of a node for hosting the VM. As a result, the VM can be provisioned on a node that has the resources specified by the resource requirements of the SLA associated with this VM.

The additional requirements indicate operational element(s) needed in a node for hosting the VM. For example, these additional requirements can include availability requirements, data protection requirements, and security requirements, among others. The availability requirements can define the VM's availability requirement(s). The data protection requirement(s) can indicate data protection elements needed in a potential node for hosting the VM. The security requirement(s) can indicate security elements needed in the potential node for hosting the VM. The operation element(s) can indicate data protection elements needed in a potential node for hosting the VM.

Figure 7:
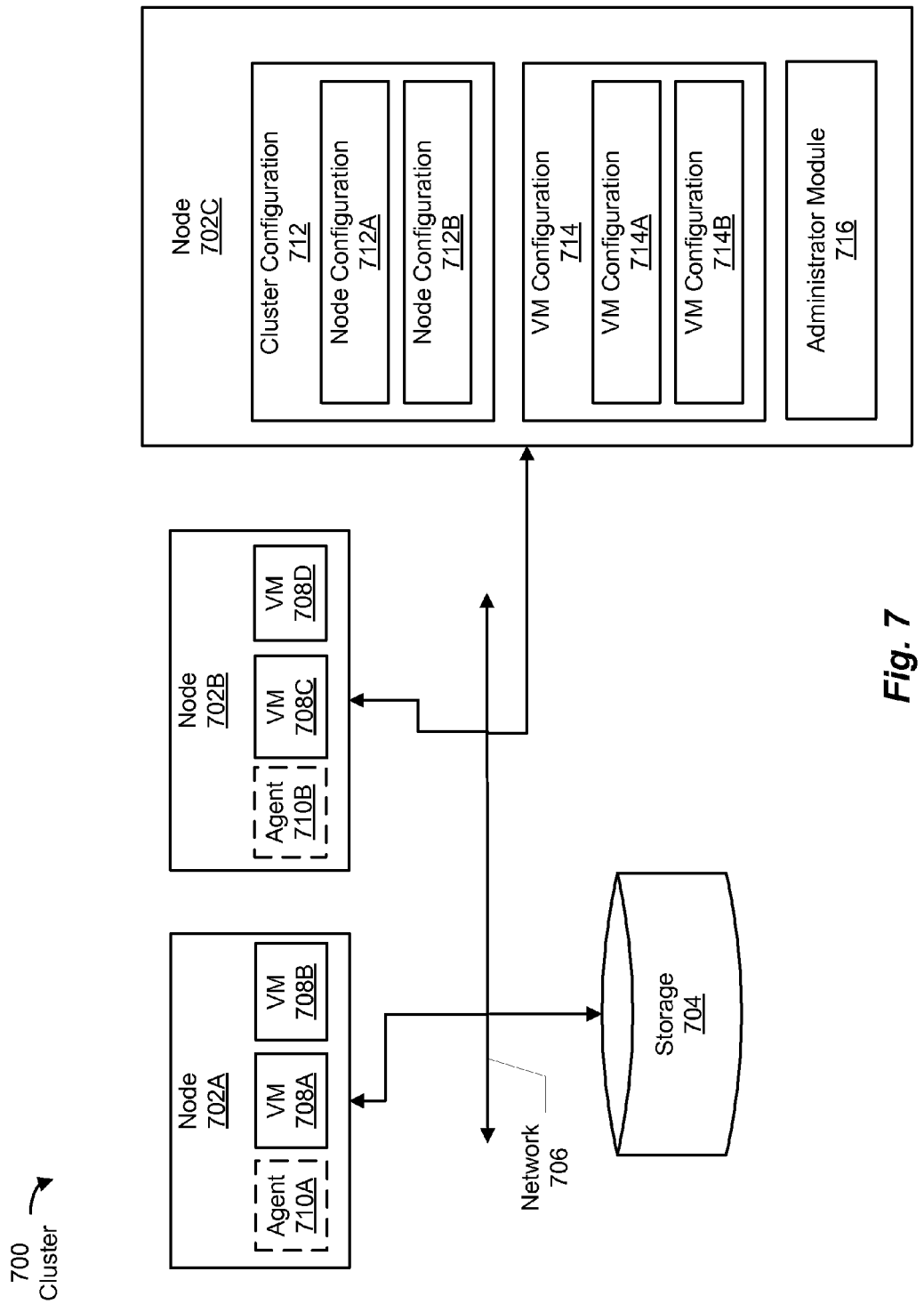
FIG. 7 is another block diagram illustrating a cluster that includes a collection of nodes and storage, according to one embodiment.

In one embodiment, node(s) in the cluster includes an administrator module, e.g., administrator module 114. It is noted that while FIG. 1 shows a single node (node 102C) supporting such administrator module, which is done for illustrative purposes only. Such as administrator module 114 can be implemented, executed, and/or stored anywhere in cluster 100. For example, administrator module 114 can be distributed among nodes 102A and 102B of cluster 100, and/or storage 104. In one embodiment, one or more agents (such as shown in FIG. 7) are used instead of, or in addition to, the administrator module. Administrator module 114 can also be stored outside cluster 100, such as at a central repository, and be accessed via network 106, such as for execution, as desired. It is noted that a cluster, in general terms, is a collection of nodes that are grouped together and can share one or more resources. Typically, a cluster is a collection of nodes that share the same storage system. In one implementation, the nodes of a cluster are managed by the same cluster software. As a result, VMs can be easily provisioned from one node of a cluster to another node on that same cluster. In one implementation, the nodes in a single cluster are connected together, such as by a network, e.g., a Local Area Network (LAN).

In one embodiment, administrator module 114 accesses virtual machine configuration 112 of a virtual machine that is to be provisioned. For example, administrator module 114 (and/or agent(s)) can receive a request that such a VM is to be provisioned at a node at a cluster, as long as this node matches the requirements in the VM configuration associated with this VM. Administrator module 114 (and/or agent(s)) can access cluster configuration 110 of cluster 100. Administrator module 114 (and/or agent(s)) can then compare VM configuration 112 and cluster configuration 110. Administrator module 114 (and/or agent(s)) can also access a cluster configuration of another cluster (not shown). This example illustrates how the administrator node can access cluster configuration of several clusters. Thus, administrator module 114 (and/or agent(s)) can access cluster configuration (not shown) of other clusters.

For example, a second cluster can include several nodes, which can be configured to host at least one VM. Cluster configuration for this second cluster can also include configuration information for these nodes. The administrator module can then compare the VM configuration and the second cluster configuration. The administrator module can determine which cluster from the accessed clusters (e.g., cluster 100 and the second cluster) can best host the VM, such as based on the comparison of the cluster configuration for the accessed clusters. Once the administrator module determines which cluster can host the VM, the administrator module (and/or agent(s)) can then select a node from this selected cluster.

Once the administrator module (and/or agent(s)) selects a node from this selected cluster, the administrator module (and/or agent(s)) can provision the virtual machine at one of the first nodes. In one embodiment, prior to provisioning the VM on the selected node, the administrator module and/or other module can first configure the selected node in accordance with one or more of the additional requirements. For example, the administrator module and/or the other module can configure operational characteristic(s) in the selected node. For example, to comply with the data protection requirement (of VM configuration) for hosting the VM, the administrator module (and/or agent(s)) can configure a certain data protection technique for a node (or for any VMs hosted by this node).

VM configuration 112 can also be stored with VM configurations for the other VMs that are already being hosted (e.g., VM configuration for VMs 108A-108C). The VM configuration can be stored with VM configuration for cluster 100 as well as the other cluster(s). For example, as described below, such stored VM configuration can be used to determine whether nodes that are hosting VMs are maintaining their operation as agreed in the respective SLAs. In one embodiment, VM configuration can be stored for a VM once that VM is provisioned.

Figure 2A:
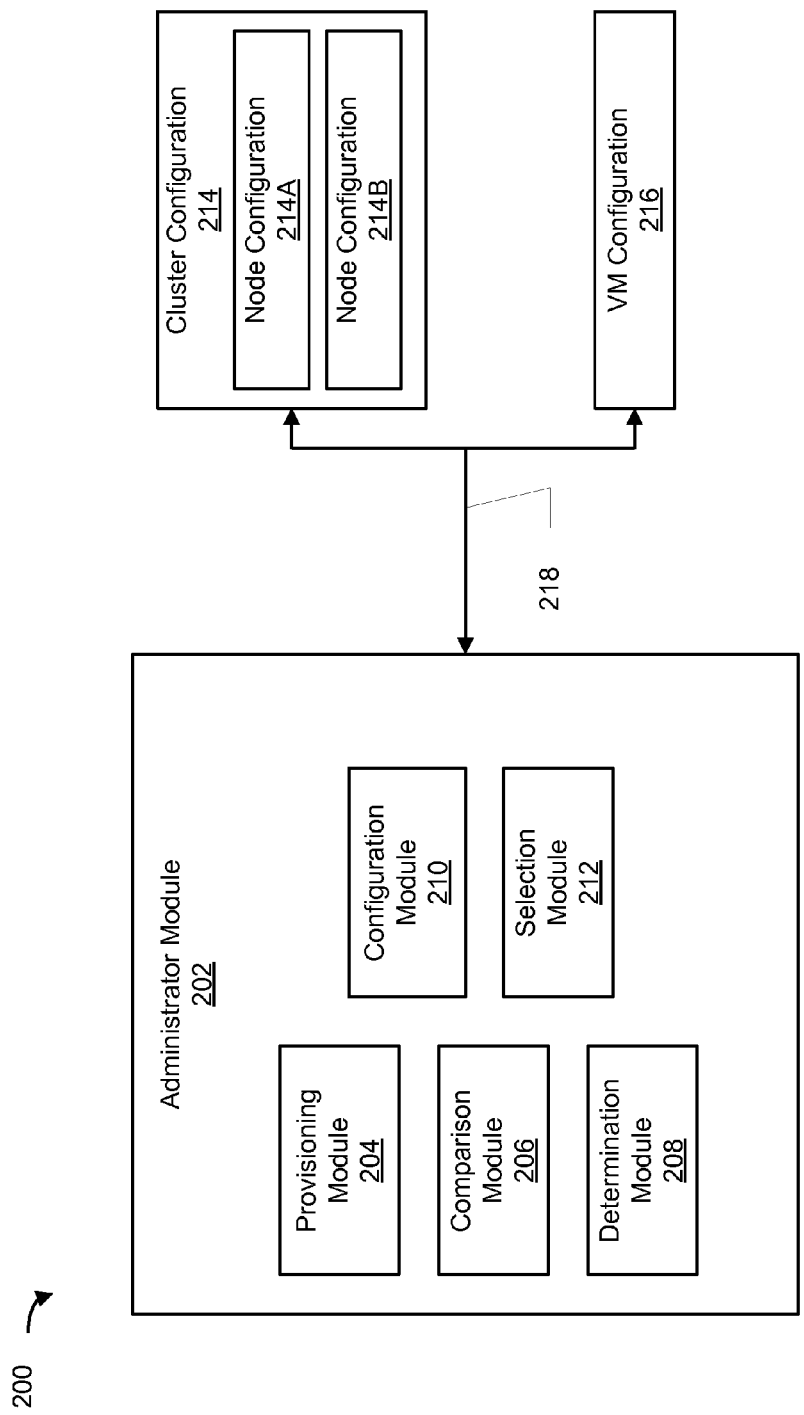
FIGS. 2A and 2B are a blocks diagram illustrating communication between an administrator module and configuration information, according to one embodiment.

FIG. 2A is a block diagram illustrating an administrator module accessing cluster configuration and VM configuration, according to one embodiment. As shown, administrator module 202 includes a provisioning module 204, a comparison module 206, a determination module 208, a configuration module 210, and a selection module 212. It is noted that in some embodiments, the various modules of administrator module 202 may be combined or further divided, and are depicted in FIG. 2A as such, solely for purposes of illustration. Thus, administrator module 202 can include fewer, or additional modules, as desired. Furthermore, in some embodiments, one or more of these modules may be combined. For example, comparison module and determination module can be combined into one module. Still further, various modules of administrator module 202 may be implemented as a single software and/or hardware module, as desired. Administrator module 202 can be an implementation of administrator module 114 of FIG. 1. In one embodiment, agent(s) can implement some, or all, of functionality of the administrator module.

Comparison module 206 is operable to compare VM configuration to cluster configuration, such as cluster configuration 214. In one embodiment, comparison module 206 can access node configuration for each cluster. In this embodiment, comparison module 206 accesses resources and/or operational elements of each such node. In another embodiment, comparison module 206 can access cluster information to access configuration information for nodes (of that cluster). For example, such cluster information can already be created to reflect the resources and/or operational elements for node(s) that are included by that cluster. Comparison module 206 can determine whether the additional requirements (of VM configuration) match the operational elements of nodes for the respective cluster. Determination module 208 is operable to determine a cluster from various clusters that are compared by comparison module 206. Determination module 208 is configured to perform the determination based on a comparison of the VM configuration and cluster configurations for each of the various clusters.

Selection module 212 is configured to select a node from the nodes in the cluster (cluster that was determined by determination module 208). Configuration module 210 is configured to configure this selected node in accordance with the additional requirements. Provisioning module 204 is operable to provision a VM on a node of a cluster, such as node 102A of cluster 100. Provisioning module 204 can provision this VM on a node that is selected (e.g., by selection module 212) on a cluster that is determined (e.g., by determination module 208). In one embodiment, such selected node can first be configured (e.g., by configuration module 210) in accordance with additional requirements of the VM configuration for the VM that is to be provisioned.

In one embodiment, cluster configuration 214 includes configuration information for node(s) included in a respective cluster. For example, cluster configuration 214 that is associated with a cluster (e.g., cluster 100) includes configuration information for nodes 102A and 102B. In one embodiment, cluster information 214 includes separate configuration information for its respective nodes, e.g., node A configuration 214A and node B configuration 214B. In other embodiments, cluster configuration 214 includes configuration information that has already been generated for its nodes. VM configuration 216 can include resource requirement(s) and additional requirement(s) for a VM that is to be provisioned. VM configuration 216 is further described below with reference to FIG. 4. Administrator module 202 can access cluster information 214 and/or VM configuration using a connection 218, which can be a memory bus, software API/function calls, notifications, data messaging, and/or a network, etc., depending on implementation.

Figure 2B:
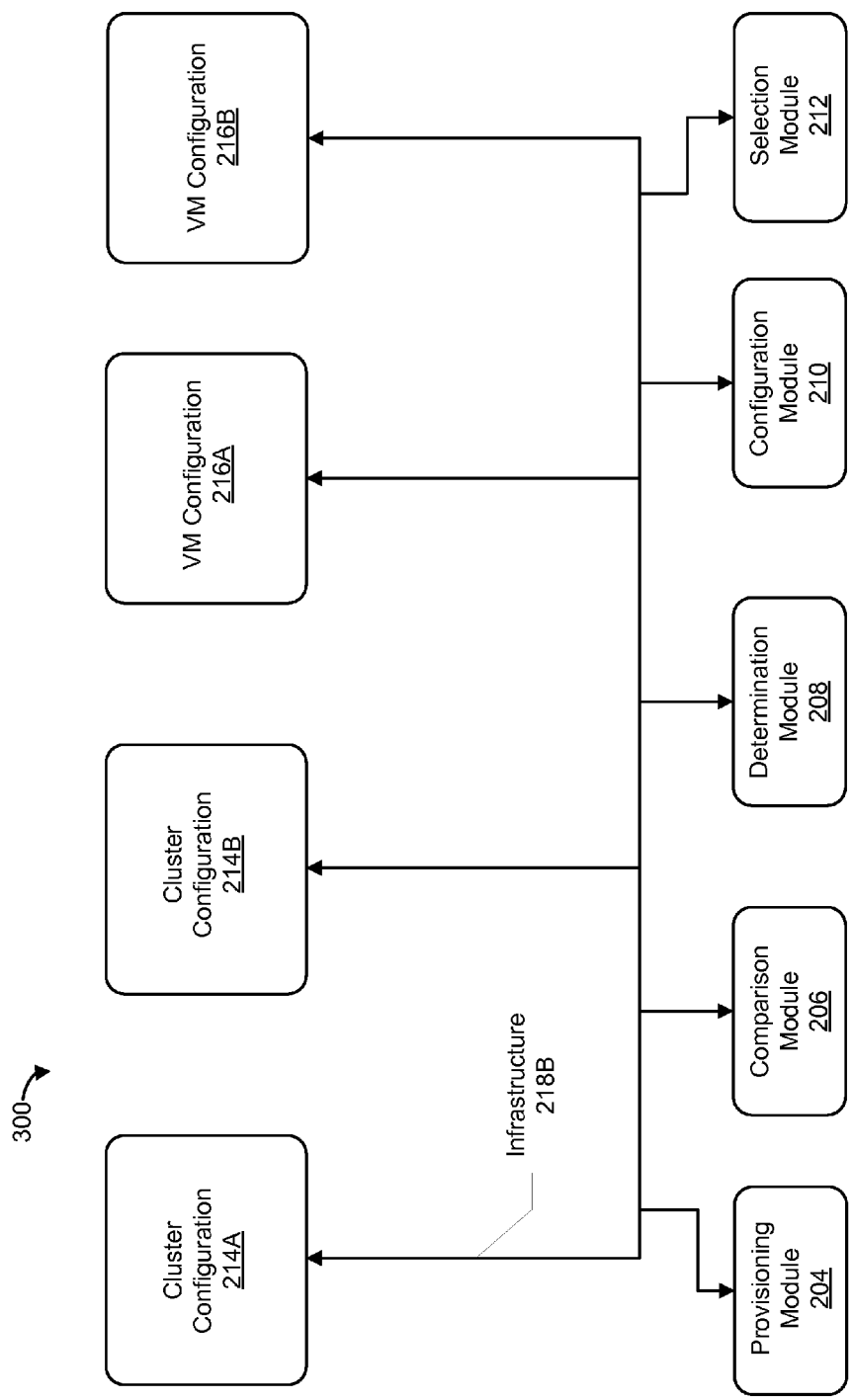

For example, FIG. 2B is a block diagram showing one implementation of how various modules of an administrator module (e.g., administrator module 202 of FIG. 2) can access cluster information VM configuration. In one embodiment, various modules of an administrator module (e.g., a provisioning module 204, a comparison module, 206, a determination module 208, a configuration module 210, and a selection module 212) can access cluster information for two clusters (e.g., cluster configuration 214A of a first cluster and/or cluster configuration 214B of a second cluster). In one embodiment, various modules of the administrator module can also/instead access VM configuration 216A for a first VM to be provisioned, and also VM configuration 216B for a second VM to be provisioned. Various modules of the administrator module (and/or agent(s)) can access such cluster configuration and/or VM configuration using an infrastructure 218, which can be a memory bus, software API/function calls, notifications, data messaging, and/or a network, etc., depending on implementation.

FIG. 3 is a block diagram of a VM configuration 302, such as VM configuration described in FIGS. 1-2. VM configuration 302 can include resource requirement(s) 304 and additional requirement(s) 306. Resource requirement(s) 304 can include resource requirement(s) 304A, 304B, . . . 304N. Additional requirement(s) 306 can include additional requirement(s) 306A, 306B, . . . 306M.

Resource requirement(s) 304 can define the VM's various resource requirements. Resource requirements can include CPU, memory, network, platform, IS, boot disk image, etc. These are typically hardware requirements of the node (e.g., a server) for hosting a VM. Additional requirement(s) 306 can include availability requirements, data protection requirements, and security requirements.

Availability requirements can define the VM's availability requirement(s), e.g., the number of physical host failures that the virtual machine needs to be able to tolerate, the number of remote sites configured for the virtual machine's disaster recovery, etc. For example, a requirement could include that a VM needs to tolerate N physical host failures. This requirement can be met by the clusters having at least N+1 physical hosts capable of meeting the VM's resource requirement(s). In another example, a requirement can include a VM tolerating one site failure, i.e., it needs to have a Disaster Recovery setup. This requirement can be met only by the clusters in the data centers that have Disaster Recovery (DR) configured, such as where there is a cluster (e.g., at a remote site) that can be used to activate the virtual machines active on the cluster. For example, a cluster in New York could have a corresponding DR cluster setup in London. If a host in the New York cluster fails, the virtual machines that were active on the cluster in New York can be made available via the DR cluster in London.

Data Protection Requirements define the frequency, media and method/type for the backup or the snapshot of the virtual machine. For example, a requirement may be that an image needs to be backed up every H hours using a particular type of backup software. Another requirement may require use of a certain type of backup, such as incremental or full backup. This requirement can be met by hosts that have appropriate backup software (e.g., NBU, BackupExec) setup and have access to backup media.

Security Requirements define the security zones for the virtual machine to restrict the networks that the virtual machine will have access to, policies and frequency for malware scanning, etc. For example, a requirement may be to scan a VM disk image for virus every N hours. This requirement can be met by setting virus scan software within a VM and/or the node hosting a VM. Alternatively, this requirement can be done offline from wherever VM image is accessible, e.g., where the VM image is placed, or another host that has access to the virtual machine's disk image. In another example, a requirement can be to have a virtual infrastructure be compliant to some guidelines e.g., VMware vSphere guidelines. This requirement can be met by checking the hypervisor, network, storage for compliance with compliance assessment systems such as CCS. Another example of a requirement is that the VM needs to be provisioned on a host that has DLP gateway configured to scan all outbound traffic. This SLA can be met by hosts that have DLP gateway that can be configured to scan all outbound traffic of a VM.

FIG. 4 is a flowchart illustrating a method for management and provisioning of virtual machines, according to one embodiment.

In element 402, a cluster is selected for hosting a VM. For example, a cluster is selected based on VM configuration of a VM. This cluster selection is described in more detail with regard to FIGS. 5 and 16, among others.

In element 404, a node is selected within the selected cluster for hosting the VM. For example, a node is selected within the selected cluster based on the VM configuration. This node selection is also described in more detail with regard to FIGS. 5 and 16, among others.

In element 406, the VM is provisioned on the selected node. For example, the VM is provisioned using the VM configuration. This VM provisioning is also described in more detail with regard to FIGS. 5 and 16, among others.

In element 408, a determination is made whether the node hosting the VM is operating within the operating parameters. If the node hosting the VM is not operating within the operating parameters, then execution of method 400 can start again at element 402. This is described in more detail with regard to FIGS. 12 and 13, among others.

Figure 5:
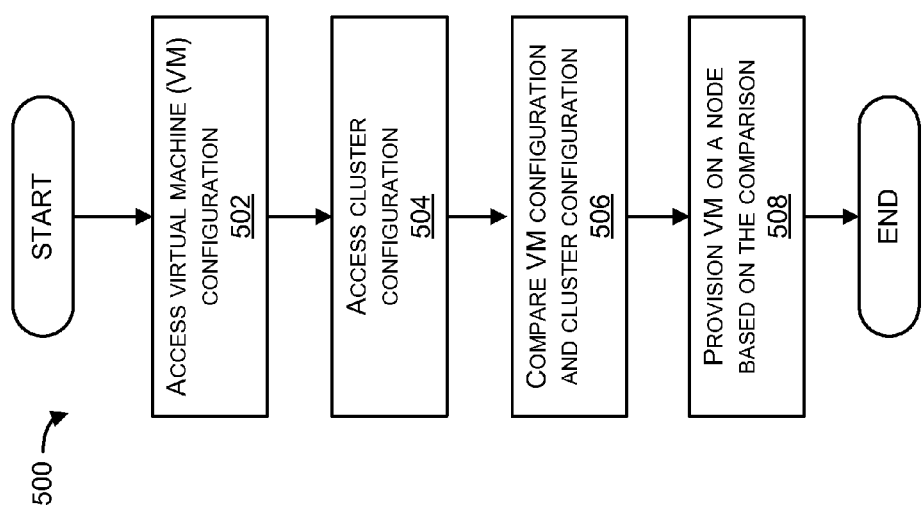
FIG. 5 is a flowchart illustrating a method for providing a virtual machine at a node of a cluster selected using virtual machine configuration, according to one embodiment.

FIG. 5 is a flowchart 500 of a method for management and provisioning of virtual machines, according to one embodiment. As will be appreciated in light of the present disclosure, this method may be modified by in order to derive alternative embodiments. Also, the steps in this embodiment are shown in sequential order. However, certain steps may occur in a different order than shown, certain steps may be performed concurrently, certain steps may be combined with other steps, and certain steps may be absent in another embodiment. Method 500 is described with reference to variations of the elements described in connection with FIGS. 1-3.

In 502, a VM configuration is accessed. For example, an administrator module (e.g., administrator module 114) (and/or agent(s)) can access a VM configuration (e.g., VM configuration 112). It is noted that the administrator module can be distributed across (and/or executed by) several nodes of a single or several clusters, as desired. The VM configuration is associated with a VM that is to be hosted by a node. In one embodiment, the VM associated with the VM configuration is not yet hosted on any node of any cluster. In other words, the VM configuration may be received by a command for creating and/or hosting this VM. In another embodiment, this VM is already being hosted by a node on one of clusters in the system. In this case, a command may be received for provisioning the VM from one node to another node (on the same or different cluster).

In 504, a cluster configuration is accessed. For example, the administrator module (and/or agent(s)) can access a cluster configuration (e.g., cluster configuration 110). The cluster configuration can be stored on one or more nodes of the respective cluster and/or be stored outside of this cluster. In one embodiment, the cluster configuration can include node configuration for node(s) in that respective cluster. In one embodiment, cluster configuration can include both information about resources for node(s) in the cluster, as well as operational element(s) in the cluster. In one embodiment, when accessing the cluster configuration, the administrator module can determine the current operational characteristics of nodes in the cluster.

In 506, the VM configuration and the cluster configuration are compared. For example, the administrator module (and/or agent(s)) can compare VM configuration 112 and cluster configuration 110. The administrator module can determine whether the additional requirements match the operational elements of the nodes for the cluster. It is noted that steps 504 and/or 506 can be repeated for several clusters, as described with reference to FIG. 6.

In 508, the VM is provisioned at a node based on the comparison of element 506. For example, the administrator module (and/or agent(s)) can provision the VM for hosting at node 102A. In one embodiment, once this VM is hosted at the node, the VM configuration associated with this node can be stored along with VM configurations for other VMs in this cluster (e.g., with VM configurations for VMs 108A-108C).

Figure 6:
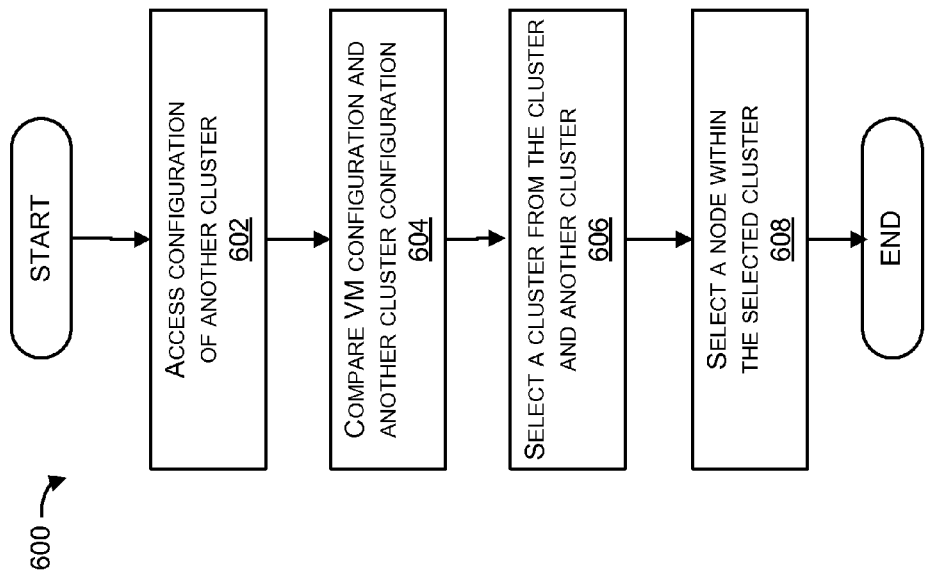
FIG. 6 is a flowchart illustrating a method for selecting a cluster and/or a node using virtual machine configuration, according to one embodiment.

FIG. 6 is a flowchart 600 of a method for management and provisioning of virtual machines, according to one embodiment. As will be appreciated in light of the present disclosure, this method may be modified in order to derive alternative embodiments. Also, the steps in this embodiment are shown in sequential order. However, certain steps may occur in a different order than shown, certain steps may be performed concurrently, certain steps may be combined with other steps, and certain steps may be absent in another embodiment. Method 600 is described with reference to variations of the elements described in connection with FIGS. 1-3. In one embodiment, the method of FIG. 6 implements elements 504 and/or 506 of FIG. 5.

In 602, a cluster configuration of another cluster is accessed. For example, the administrator module (and/or agent(s)) can access one or more cluster configurations of clusters other than cluster 100. The cluster configuration can include node configuration for node(s) in that respective cluster, including both information about resources for node(s) in the cluster, as well as operational element(s) in the cluster.

In 604, the VM configuration and the cluster configuration are compared. For example, the administrator module (and/or agent(s)) can compare VM configuration 112 and cluster configuration for several clusters. The administrator module can determine whether the additional requirements match the operational elements of the nodes for each respective cluster.

In 606, a cluster is selected from the various clusters accessed by the administrator module. For example, based on the comparison(s) of step 604, the administrator module (and/or agent(s)) can determine which cluster matches with the additional requirements specified by the VM configuration. The administrator module can use various techniques for selecting the best matching cluster. In one embodiment, the administrator module can assign weights to various resource requirements and/or additional requirements. Depending on such weighting, different clusters may be selected. For example, if data protection is heavily weighted, then cluster(s) having nodes with sophisticated data protection mechanisms are likely to be selected. In another embodiment, the n-ary tree technique described below can be used.

In 608, a node is determined from the selected cluster. For example, once the administrator module (and/or agent(s)) determines a cluster for hosting the VM, a node can be determined in this selected cluster for hosting the VM. The administrator module can access node configurations for nodes in the selected cluster when making this determination. Various techniques can be used to select the node from the cluster, including using the node configurations to determine which node matches the VM configuration of the VM to be hosted. Once the node is determined, the administrator module can facilitate in hosting the VM on the determined node.

FIG. 7 is a block diagram illustrating a cluster 700 that includes a collection of nodes and storage. Cluster, e.g., cluster 700, includes several nodes, e.g., nodes 702A, 702B, and 703C. Each node can communicate with storage, e.g., storage 704, using a network, e.g., network 706. Although only three nodes 702A-702C are shown, cluster 700 may include a different number of nodes. Each such node can implement one or more virtual machines, e.g., virtual machines 708A-708D. In some embodiments, each node may implement virtual machines using hypervisor technology, although other designs are contemplated. Furthermore, some nodes can also implement an agent, e.g., agents 710A and 710B.

In one embodiment, node(s) in the cluster include cluster configuration, e.g., cluster configuration 712. Cluster configuration can include configuration information for the cluster and/or configuration information for node(s). For example, cluster configuration 712 can include configuration information 712A for node A 702A and configuration information 712B for node B 702B. It is noted that while FIG. 7 shows a single node (node C 702C) supporting such cluster configuration, which is done for illustrative purposes only. Such a cluster configuration 712 can be implemented, accessed, and/or stored anywhere in cluster 700. For example, cluster configuration 710 can be distributed among nodes 702A and 702B of cluster 700, and/or storage 704. Cluster configuration can also be stored outside cluster 700, such as at a central repository, and be accessed via network 706, as desired. In one embodiment, cluster configuration and/or VM configuration can be stored in a database. Such database can store cluster configuration and/or VM configuration for several clusters.

VM configuration, such as VM configuration 714, includes resource requirement(s), and one or more additional requirement(s). It is noted that while FIG. 7 shows a single node (node C 702C) supporting such VM configuration, which is done for illustrative purposes only. Such VM configuration 714 can be supported, implemented, accessed, and/or stored anywhere in cluster 700. For example, VM configuration 714 can be distributed among nodes 702A and 702B of cluster 700, and/or storage 704. VM configuration can also be stored outside cluster 700, such as at a central repository, and be accessed via network 706, as desired. In one embodiment, the VM configuration is included in the VM's service level agreement (SLA). As shown, VM configuration 714 can include VM configurations 714A and 714B associated with VM 708A and 708B, respectively. Both of VM 708A and 708B are already being hosted by node 702A. VM configurations associated with VM 708C and/or 708D can be also stored by VM configuration 714, and/or can be stored elsewhere.

In one embodiment, administrator module 716 (and/or agent(s)) access virtual machine configuration 714 associated with a VM that is already being hosted. For example, administrator module 716 perform an analysis that such a VM is to be provisioned at a node at a cluster, as long as this node matches the requirements in the VM configuration associated with this VM. Administrator module 116 can access cluster configuration 110 of cluster 100. Administrator module 116 can then compare VM configuration 112 and cluster configuration 110. Administrator module 116 can also access a cluster configuration of another cluster. This example illustrates how the administrator node can access cluster configuration of several clusters. Thus, administrator module 116 (and/or agent(s)) can access cluster configuration (not shown) of other clusters. The administrator module can also be distributed among nodes of different clusters, as desired.

In one embodiment, the administration module and/or the agent(s) for the nodes determine operational indicator(s) of the nodes, e.g., nodes 702A and 702B. The operational indicator(s) indicate operation characteristics of each respective node. These operational indicator(s) can include availability, data protection, and/or security requirements, among others. Operational indicator(s) can be dynamic, i.e., they can change over time. An agent on each node (e.g., agent 710A on node 702A) can determine operational indicator(s) for node 702A. In one embodiment, each node can use a separate agent. In another embodiment, agent(s) can be associated with several nodes in a single cluster, as desired.

The administrator module (and/or agent(s)) can compare the operational elements (i.e., of the respective VM configuration) and the operational indicators of the respective node. Such a comparison can be performed to determine whether the node is still providing the operational characteristics for the VM that were specified prior to hosting this VM on the node. The administration module (and/or agent(s)) can thus determine whether a VM is operating within its operating characteristics (as specified by its VM configuration, e.g., in an SLA). This comparison can be performed for several VMs of cluster 700.

Figure 8:
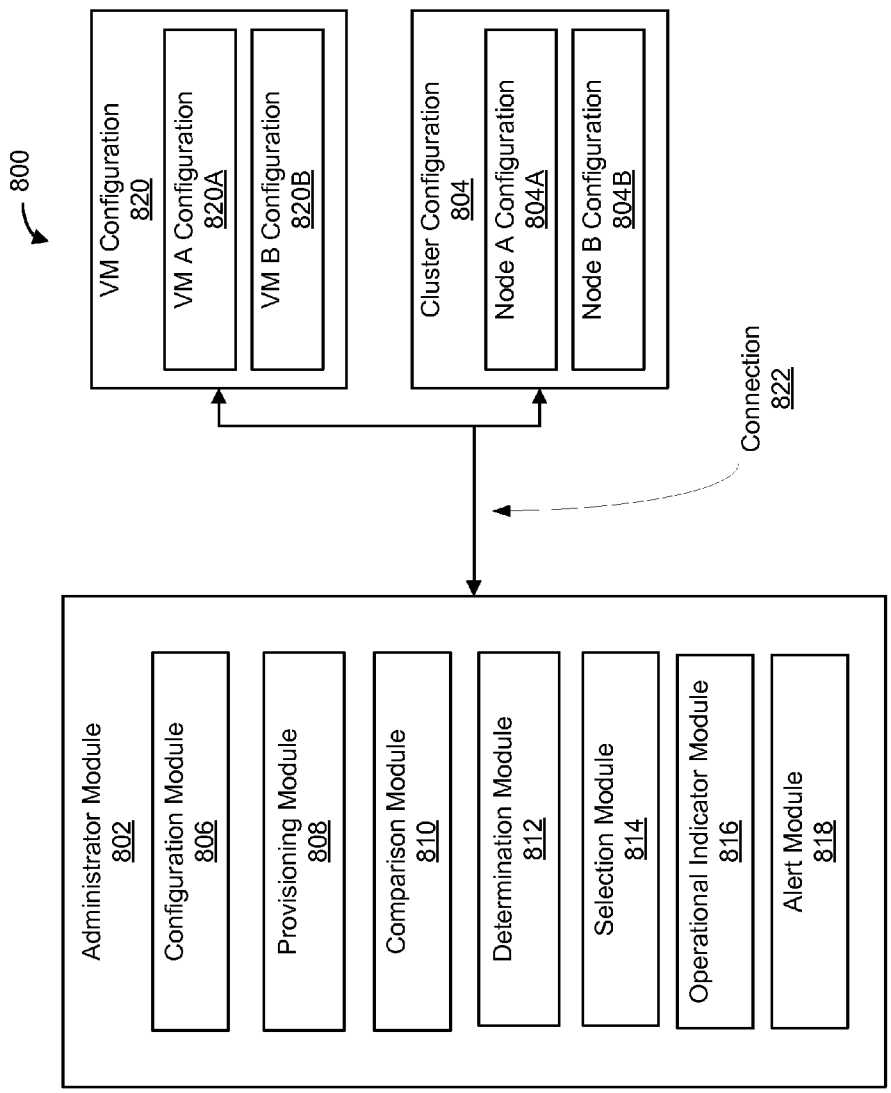
FIG. 8 is another block diagram illustrating an administrator module, according to one embodiment.

FIG. 8 is a block diagram illustrating an administrator module accessing cluster configuration 804 and VM configuration 820, according to one embodiment. As shown, administrator module 802 includes a configuration module 806, a provisioning module 808, a comparison module 810, a determination module 812, a selection module 814, an operational indicator module 816, and an alert module 818. It is noted that in some embodiments, the various modules of administrator module 802 may be combined or further divided, and are depicted in FIG. 8 as such, solely for purposes of illustration. Thus, administrator module 802 may include fewer, or additional modules, as desired. Furthermore, in some embodiments, one or more of these modules may be combined. For example, comparison module 810 and determination module 812 can be combined into one module. Still further, various modules of administrator module 802 may be may be implemented as a single software and/or hardware module, as desired. Administrator module 802 can be an implementation of administrator module 114 of FIG. 1 and/or administration module 716 of FIG. 7. In one embodiment, various modules of administrator module 802 may operate analogously to that of administrator module 202 of FIG. 2A. In one embodiment, agent(s) can implement some, or all, of functionality of the administrator module.

Comparison module 810 is operable to compare VM configuration of a VM and node configuration associated with the node that is hosting this VM. For example, comparison module 810 can access VM A configuration 820A associated with a VM (e.g., VM 708A) that is hosted by a node (e.g., node 702A). Comparison module 810 can compare this VM A configuration 820A and the configuration for this node (i.e., node 702A). In one embodiment, comparison module 810 may access resources and/or operational elements of this node. Comparison module 810 can determine whether the additional requirements (of VM configuration) match the operational elements of the node that is hosting the respective VM.

Operational indicator module 816 is configured to determine operational indicator(s) of node(s) included in a cluster (e.g., nodes 702A and 702B of cluster 700). Operational indicator module 816 can communicate with agent(s) on respective node(s). For example, agent(s) can be executed in order to determine various operational characteristics of a node. The agent(s) can then send the operational characteristics to the operational indicator module 816, which can then generate the operational indicators using the received operational characteristics. In one embodiment, the agent(s) can generate the operational indicators, and then send the operational indicators to the operational indicator module 816.

Determination module 812 is configured to determine a deviation by performing an analysis, and determine whether the deviation is within a range. Alert module 818 is configured to generate an alert if this deviation is outside a range. In one embodiment, the range is predetermined prior to this deviation determination. In another embodiment, the range is dynamically determined, such as when determining the operational indicator(s) of the node. Administrator module 802 can access cluster configuration 804 and/or VM configuration 820 using a connection 822, which can be a memory bus, software API/function calls, notifications, data messaging, and/or a network, etc., depending on implementation.

Figure 9:
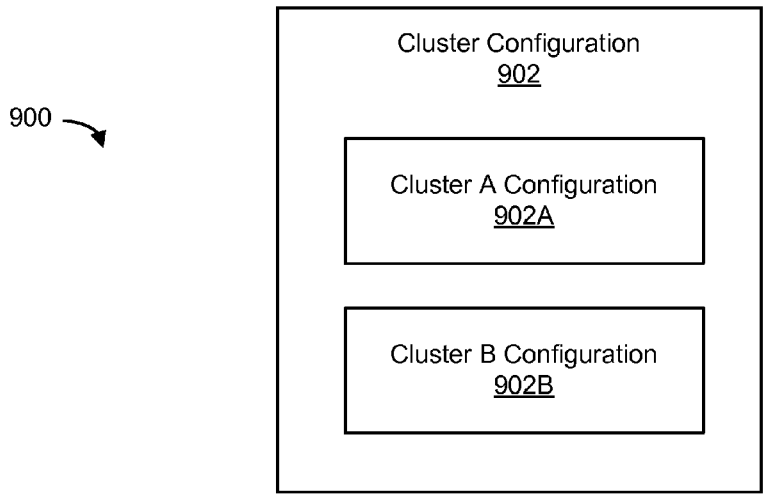
FIG. 9 is a block diagram illustrating various components of a cluster configuration, according to one embodiment.

FIG. 9 is a block diagram 900 of a cluster configuration 902, such as a cluster configuration described in previous Figures. Cluster configuration 902 can include cluster A configuration 902A for a first cluster (e.g., cluster 700) and cluster B configuration 902B for another cluster (not shown). Cluster configuration 902 can be stored in a repository, in a database, or be distributed among various clusters, or storage elements, as desired.

Figure 10:
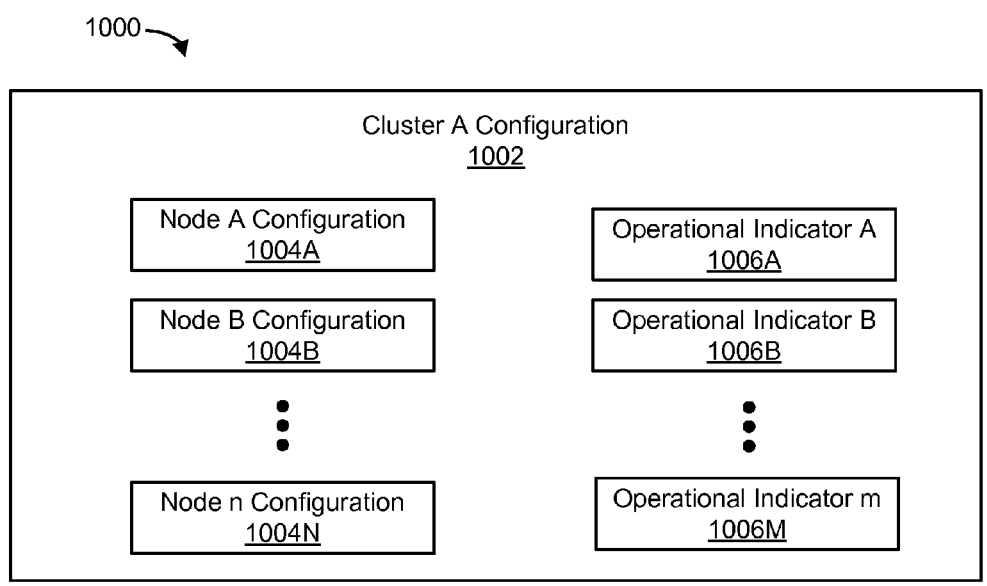
FIG. 10 is another block diagram illustrating various components of a cluster configuration, according to one embodiment.

FIG. 10 is a block diagram 1000 of a cluster configuration 1002, such as cluster configuration described in previous Figs. Cluster configuration 1002 can include configuration information for nodes of a given cluster, i.e., by using node configuration 1004A-1004N. Cluster configuration 1002 can also include operational indicators 1006A-1006N. It is noted that operational indicators 1006A-1006N can be determined dynamically for a cluster and/or node of that cluster. For example, some operational indicators can be associated with the cluster, whereas other operational indicators can be associated with nodes of that cluster.

Figure 11:
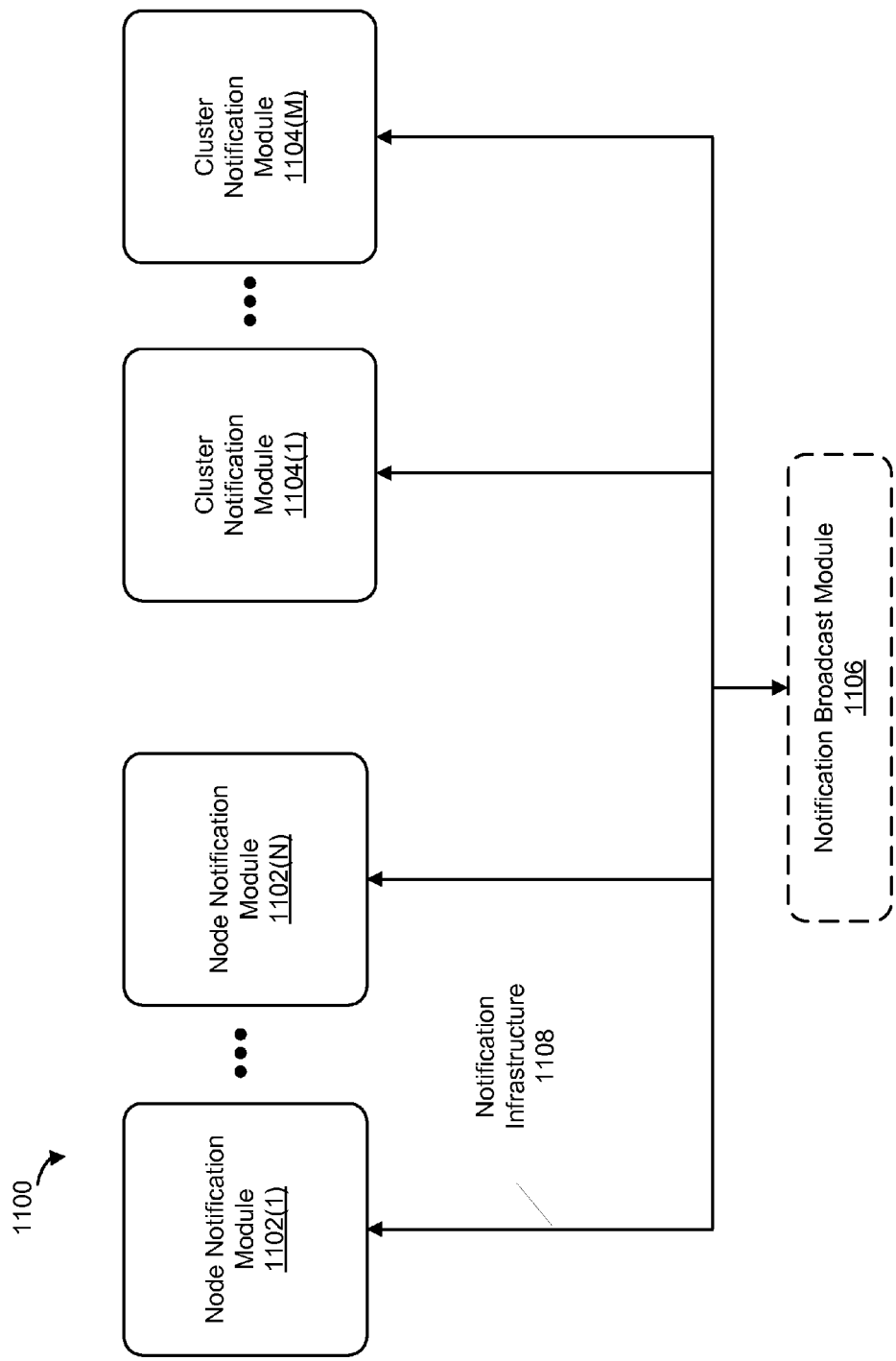
FIG. 11 is a block diagram illustrating a notification system including a notification infrastructure and notification modules, according to one embodiment

FIG. 11 is a block diagram illustrating a notification system 1100 that includes a notification infrastructure and notification modules, according to one embodiment. The notification system can be used to communicate notifications and/or responses between VMs, nodes, agents, and/or administration module(s). The notification system includes node notification modules 1102(1)-1102(N), cluster notification modules 1104(1)-1104(M), a notification broadcast module 1106, and a notification infrastructure 1108.

Node notification modules 1102 are associated with nodes of one or more clusters. Cluster notification modules 1104 are associated with clusters. Notification infrastructure 1108 facilitates sending and receiving of notifications (and responses) between notification modules 1102 and 1104. In one embodiment, node notification module 1102 sends notifications, such as notifications indicating that an operation of a node has changed. For example, an operational characteristic of a node may be modified, from having one type of data protection to another type of data protection. Such change can be detected, for example, by an agent (e.g., an agent executing on that node). As a result of this change being detected, a node notification module associated with that node can send a notification informing recipient(s) of this change. In some embodiments, the nodes are monitored for changes. In one embodiment, agent(s) can include and/or implement a node notification and/or cluster notification module(s).

Notification broadcast module 1106 is optional, and may be used in some embodiments. For example, a notification module 1102 and/or 1104 can send a notification to notification broadcast module 1106. Notification broadcast module 1106, in response to receiving such a notification from notification module 1102, can sent additional notifications (e.g., substantially similar notifications) to other notification modules 1102 and/or 1104. These notification modules 1102 and/or 1104, upon receiving a notification of change, can communicate (a notification, e.g., that this change occurred) to agent(s) and/or administrator module(s). The agent(s) and/or administrator module(s), upon receiving this notification, can access VM configuration of a VM that is being hosted by a node associated with this notification (i.e., a node where the operational characteristic was modified). In some embodiments, prior to accessing the VM configuration, the agent(s) and/or administrator module(s) first determine VM(s) that are being hosted by such a node. The agent(s) and/or administrator module(s) can then determine whether one or more VMs are operating within the operating characteristics (e.g., as specified by the respective VM configuration).

Figures 12, 13:
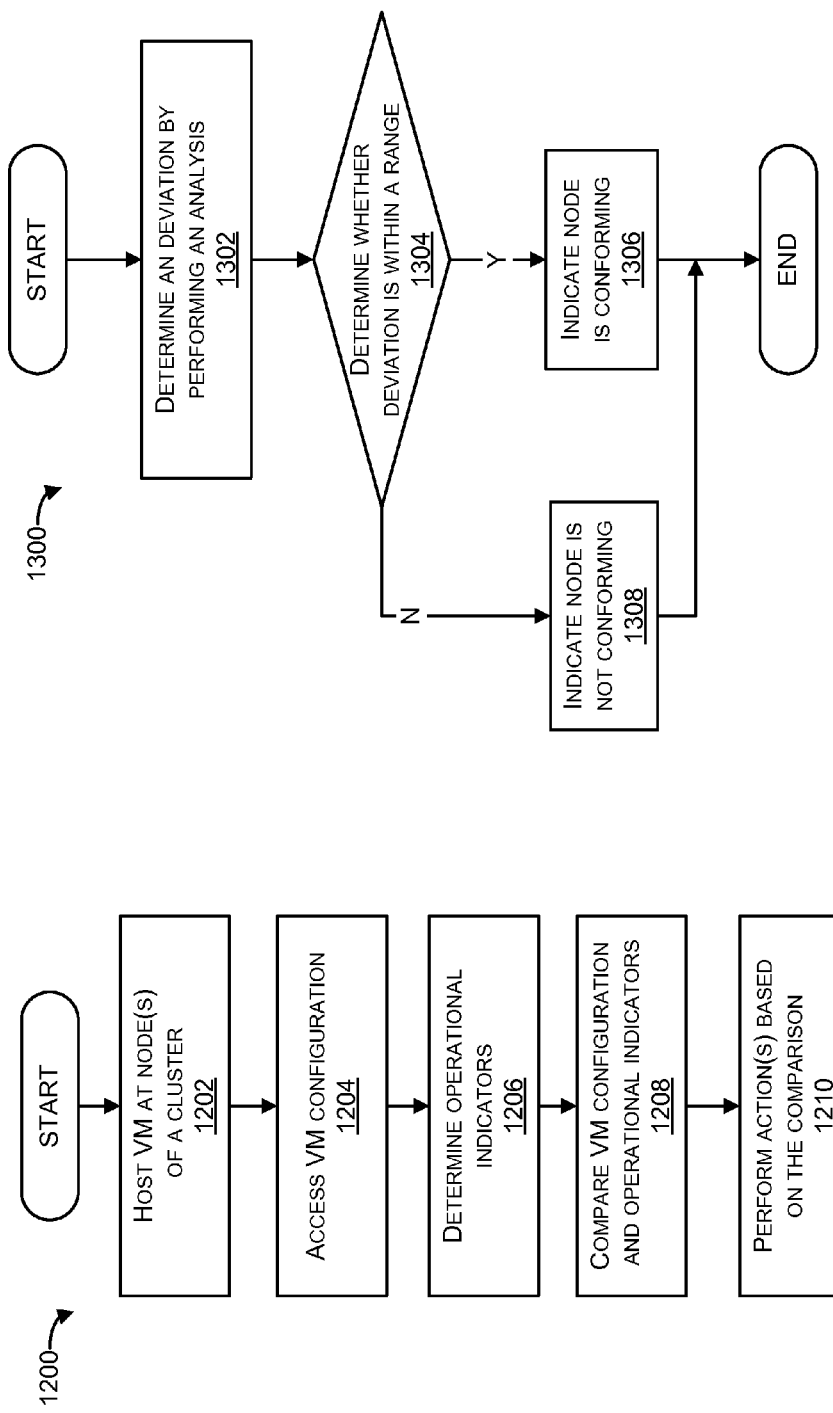
FIG. 12 is a flowchart illustrating a method for performing an action based on operational indicators of a cluster/node where a virtual machine is provisioned, according to one embodiment.
FIG. 13 is a flowchart illustrating a method for comparing virtual machine configuration to operational indicators of a cluster/node where a virtual machine is provisioned, according to one embodiment.

FIG. 12 is a flowchart 1200 of a method for management and provisioning of virtual machines, according to one embodiment. As will be appreciated in light of the present disclosure, this method may be modified in order to derive alternative embodiments. Also, the steps in this embodiment are shown in sequential order. However, certain steps may occur in a different order than shown, certain steps may be performed concurrently, certain steps may be combined with other steps, and certain steps may be absent in another embodiment. Method 1200 is described with reference to variations of the elements described in connection with FIGS. 7 and 11. It is noted that in some embodiments, various elements of the method of FIG. 12 (e.g., elements 1206-1210) are performed in response to receiving a notification that an operational characteristic of a node has changed. In other embodiments, various elements of the method of FIG. 12 (e.g., elements 1206-1210) are performed during a routine check of various nodes of a cluster to make sure that operational characteristics of a node have not deviated outside some range.

In 1202, a VM is hosted by a node. For example, VM 708D is provisioned and thus hosted by node 702B.

In 1204, a VM configuration is accessed. For example, an administrator module (e.g., administrator module 716) and/or any of agent(s) 710A-710B can access a VM configuration (e.g., VM configuration 112). It is noted that the administrator module can be distributed across (and/or executed by) several nodes of a single or several clusters, as desired. The VM configuration is associated with a VM being hosted by node.

In 1206, the operational indicators are determined. In one embodiment, the administrator module and/or agent(s) determine the current operational characteristics of nodes in the cluster. The operational indicator(s) indicate operation characteristics of each respective node. These operational indicator(s) can include availability, data protection, and/or security requirements, among others. For example, agent 710B on node 702B can determine operational indicator(s) for node 702B. In one embodiment, the administrator module and/or agent(s) can access a cluster configuration (e.g., cluster configuration 712). The cluster configuration can be stored on one or more nodes of the respective cluster and/or be stored outside of this cluster. In one embodiment, the cluster configuration includes node configuration for node(s) in that respective cluster. In one embodiment, cluster configuration can include both information about resources for node(s) of the cluster, as well as operational element(s) of the cluster, including operational indicators of the node.

In 1208, the VM configuration and operational indicators are compared. For example, the administrator module and/or agent(s) can compare VM configuration 714D and cluster configuration 712. The administrator module can determine whether the additional requirements match the operational elements of the nodes for the cluster.

In 1210, as action is performed based on the comparison of element 1208. For example, an alert may be generated if the comparison determines that the operational indicators on the node are outside of some range.

FIG. 13 is a flowchart 1300 of a method for management and provisioning of virtual machines, according to one embodiment. As will be appreciated in light of the present disclosure, this method may be modified in order to derive alternative embodiments. Also, the steps in this embodiment are shown in sequential order. However, certain steps may occur in a different order than shown, certain steps may be performed concurrently, certain steps may be combined with other steps, and certain steps may be absent in another embodiment. Method 1300 is described with reference to variations of the elements described in connection with FIGS. 7 and 11. In one embodiment, the method of FIG. 13 implements element 1208 of FIG. 12.

In 1302, a deviation is determined by performing an analysis. For example, the administrator module and/or agent(s) can access operational indicator(s) that were determined in element 1206. The administrator module and/or agent(s) can analyze the operational indicator(s) and the VM configuration to determine a deviation.

In 1304, it is determined whether the deviation is within a range. For example, the administrator module and/or agent(s) can determine whether the deviation is within a range. This range can be pre-determined prior to this analysis, or it may be dynamically determined.

In 1306, if it is determined that the deviation is within a range, it is indicated that the node is conforming to the VM configuration. In 1308, if it is determined that the deviation is outside the range, it is indicated that the node is not conforming to the VM configuration. For example, the administrator module and/or agent(s) can make this indication based on the determination of element 1304.

Figure 14:
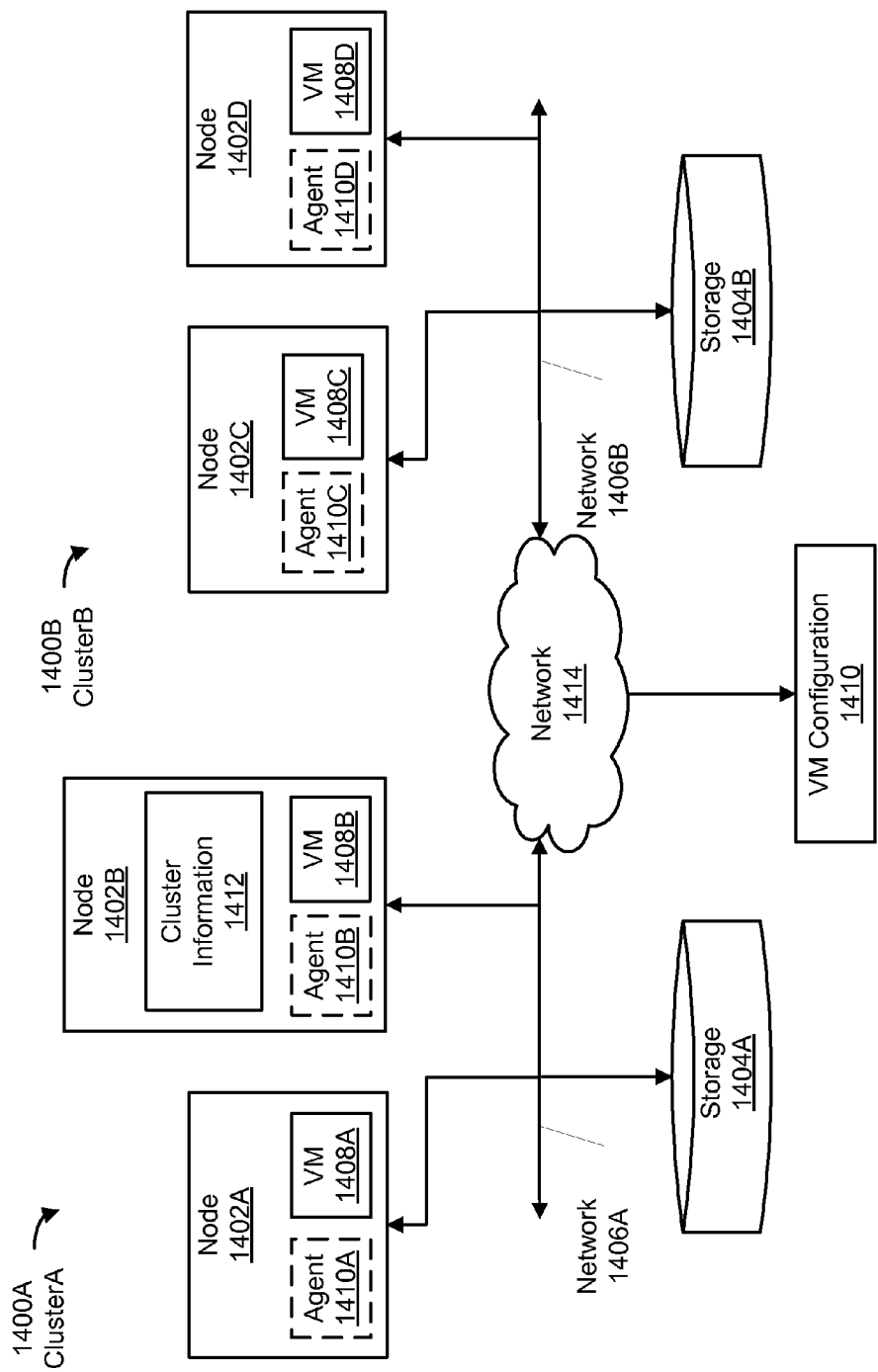
FIG. 14 is a block diagram illustrating several clusters that include a collection of nodes and storage, according to one embodiment.

FIG. 14 is a block diagram illustrating a couple of clusters, each including a collection of nodes and storage. A first cluster 1400A includes several nodes, e.g., nodes 1402A and 1402B. Each node of first cluster 1400A can communicate with storage, e.g., storage 1404A, using a network, e.g., network 1406A. Although only two nodes 1402A-1402B are shown, cluster 1400A may include a different number of nodes. node(s) can implement one or more virtual machines, e.g., virtual machines 1408A-1408B. Some nodes can also implement an agent, e.g., agents 1410A and 1410B. Similarly, a second cluster 1400B includes nodes 1402C and 1402D, virtual machines 1408C and 1408D, agent(s) 1410C and 1410D, and storage 1404B. Clusters 1400A and 1400B can communicate using a network 1414, which can be a wide area network (WAN), Internet, etc.

In one embodiment, the administration module and/or the agent(s) for the nodes can select a cluster from the clusters (e.g., clusters 1400A and 1400B) for hosting of a VM. In one embodiment, this selection can be determined as described with reference to the previous Figs. In another embodiment, the administration module and/or the agent(s) for the nodes can generate a cluster rank for each cluster. The cluster rank can indicate a likelihood of at least one of nodes of each cluster to host the VM. This cluster rank can be generated based on the VM configuration. In one implementation, the cluster information can store the cluster rank for each cluster. Selection of the cluster is based on the respective rating of each of the plurality of clusters.

In one embodiment, the generation of each cluster rank is performed based on node ranks of at least some of nodes for that cluster. For example, node ranks of nodes 1402A and 1402B can be used to calculate the cluster rank of cluster 1400A. Similarly, node ranks of nodes 1402C and 1402D can be used to calculate the cluster rank of cluster 1404B. In one embodiment, an agent of each of these nodes can calculate this node rank. For example, agent 1410A for node 1402 can calculate node rank for node 1402A. Agents 1410B-1410D can calculate node ranks for nodes 1402B-1402D. The node rank indicates how that node matches the resource requirement(s) (e.g., of VM configuration). In one embodiment, prior to generating the cluster rank, some of the node ranks can be filtered out based on the VM configuration. In one embodiment, the administrator module (not shown) and/or agent(s) can perform the generation of the cluster rank and/or node ranks by using an n-ary tree approach, as described below.

Figure 15:
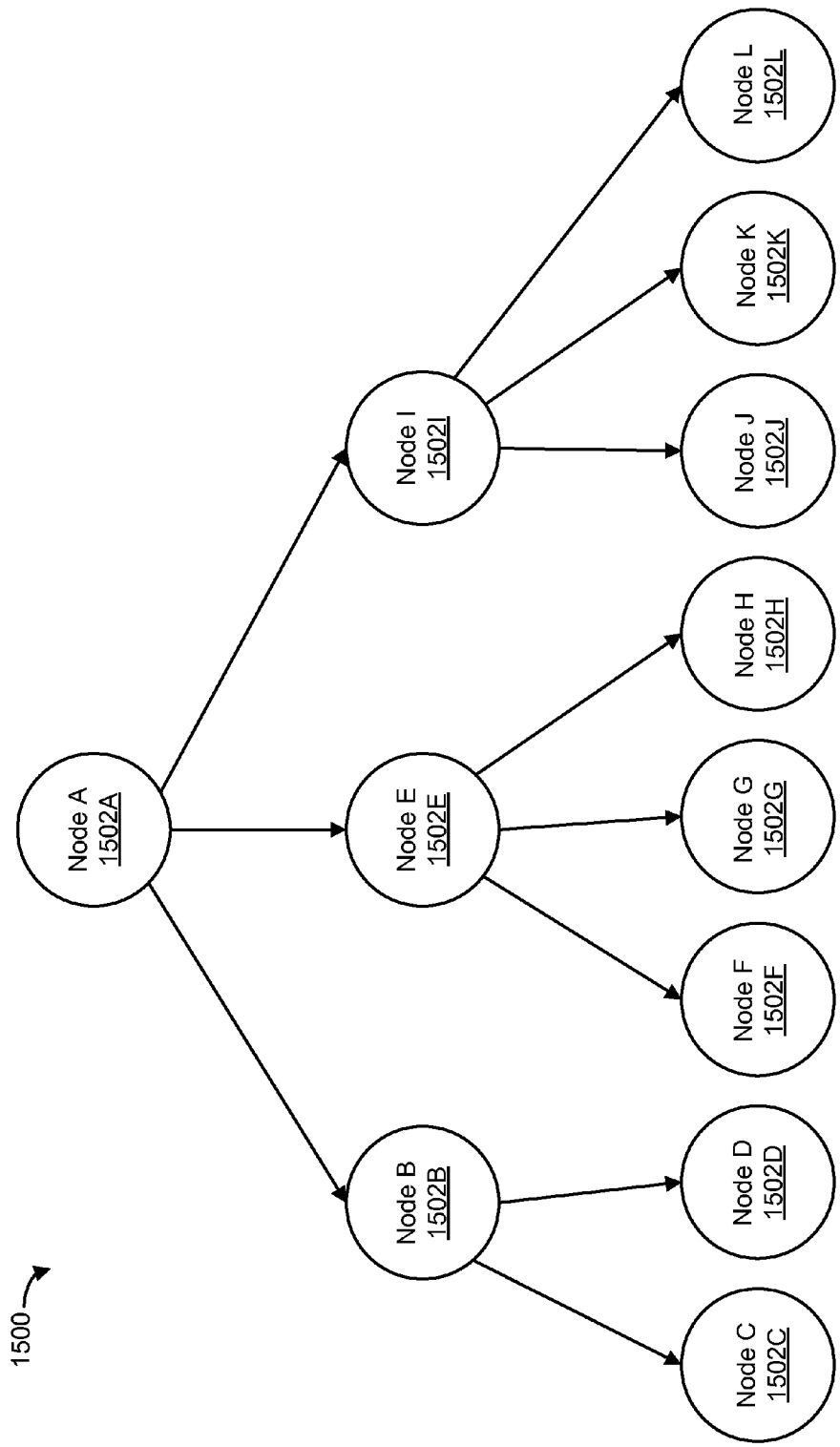
FIG. 15 is a diagram illustrating an example of a n-ary tree that can be used when comparing virtual machine configuration to operational indicators of a cluster/node where a virtual machine is provisioned, according to one embodiment.

FIG. 15 illustrates an n-ary tree, such as may be used by the administrator module and/or agent(s). The n-ary tree 1500 can contain multiple levels that contain multiple tree nodes. The levels can include a root node 1502A, a first leaf level (tree nodes 1502B, 1502E, and 1502I), and a second leaf level (tree nodes 1502C, 1502D, 1502F, 1502G, 1502H, 1502J, 1502K, and 1502L). In one embodiment, the first leaf nodes represent at least some of the clusters, e.g., tree node 1502B represents cluster 1400A and tree node 1502E represents cluster 1400B. In one embodiment, the second leaf nodes represent at least some of the nodes of each cluster, e.g., tree node 1502C represents node 1402A, tree node 1502D represents node 1402B, etc. It is noted that use of additional tree node levels is contemplated, e.g., FIG. 15 is only shown as an example implementation.

In one embodiment, nodes represented by some of the first tree nodes calculate their own respective node rank. Furthermore, nodes associated with clusters represented by some of the second tree nodes can calculate their respective cluster rank based on the node ranks of its leaf (i.e., associated lower-level) tree nodes. Thus, a tree node 1502B associated with cluster rank for cluster 1400A can calculate the cluster rank based on node ranks of lower level tree nodes 1502C and 1502D. It is noted that with reference to FIG. 14, one or more of the agents 1410A and 1410B can implement the computation associated with performing calculations for the cluster level tree nodes.

The n-ary tree is used for the distribution of work for finding more suitable clusters in the data center that can meet the virtual machine's VM configuration requirement(s) (e.g., SLA requirement(s)). In the n-ary tree, each parent (e.g., a root node for a sub-tree) distributes work to its children (e.g., leaf nodes of that subtree). Each parent node can also aggregate response from its children to pass on to its parent. The root of the n-ary tree receives response from all clusters. In one embodiment, the root tree node can aggregate final list of suitable clusters in the system (e.g., a data center).

In one embodiment, a node that is represented by each tree node performs a node ranking based on the VM configuration (e.g., the SLA requirement for the VM). The N-ary tree is built such that the lowest level of the N-ary tree is built from the sub-trees for each cluster. As a result, the root of each cluster's sub-tree will have SLA match ranking information for all the hosts in the cluster when it receives response from all its children. The root of the cluster's sub-tree can find the cluster's overall match for each of the SLA requirement by aggregating the SLA match for all the hosts belonging to the cluster. This distribution of analysis and rank generation among leaf tree nodes is efficient, as it localizes the cluster level decision making within the cluster itself.

In one embodiment, a next (higher) level of the N-ary tree is generated by grouping the clusters belonging to the same subnet together. Grouping at the subnet level can reduce multiple hop network traffic to pass the ranks for each cluster's match for each of the SLA requirement. Also, the n-ary tree can be built such that any node can have max N children. In one embodiment, the choice of N can be made based on the optimal fan-out of the communication mechanism used for the distribution across nodes.

Figures 16, 17:
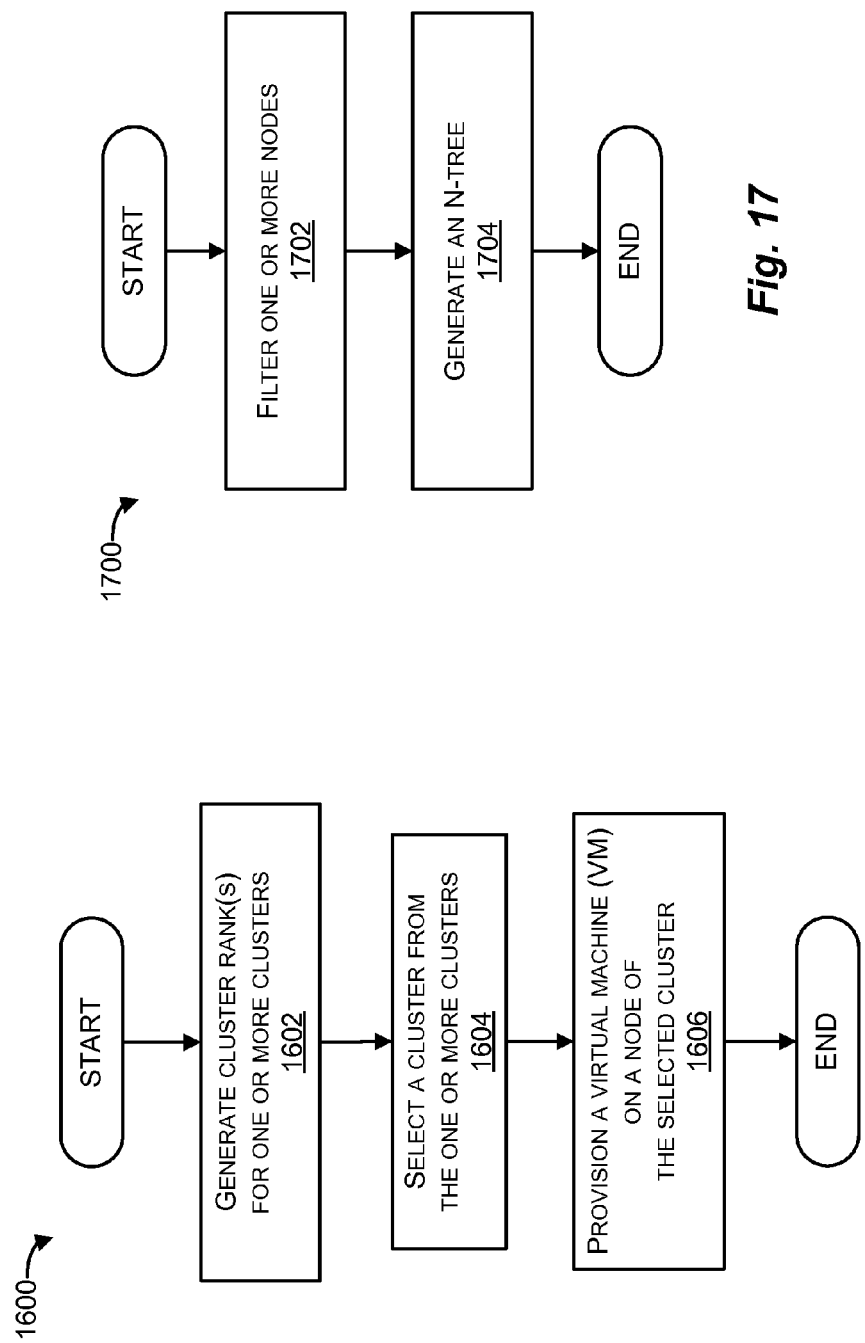
FIG. 16 is a flowchart illustrating a method for selecting a cluster for hosting a virtual machine, according to one embodiment.
FIG. 17 is a flowchart illustrating a method for generating an n-tree when selecting a cluster and/or a node using virtual machine configuration, according to one embodiment.

FIG. 16 is a flowchart 1600 of a method for management and provisioning of virtual machines, according to one embodiment. As will be appreciated in light of the present disclosure, this method may be modified in order to derive alternative embodiments. Also, the steps in this embodiment are shown in sequential order. However, certain steps may occur in a different order than shown, certain steps may be performed concurrently, certain steps may be combined with other steps, and certain steps may be absent in another embodiment. Method 1600 is described with reference to variations of the elements described in connection with FIGS. 14 and 15.

In element 1602, a cluster rank is generated for several clusters. For example, one or more agent(s) 1410A-1410D can generate a cluster rank for clusters 1400A and 1400B.

In element 1604, a cluster is selected from the clusters. For example, one or more agent(s) 1410A-1410D can select a cluster for hosting a node. This selection can be based on the cluster ranks, such as generated in element 1602.

In element 1606, a virtual machine is provisioned on a node of the selected cluster. In one implementation, a node can be selected from the selected cluster. For example, if element 1604 selects cluster 1400A, a new virtual machine (VM) can be provisioned on node 1402B once this node is selected from this cluster. Alternatively, a VM can be moved from another cluster to cluster 1400A, if for example, a node that was hosting that VM can no longer provision that VM according to that VM's configuration (e.g., operating requirements listed in that VM's SLA).

FIG. 17 is a flowchart 1700 of a method for management and provisioning of virtual machines, according to one embodiment. As will be appreciated in light of the present disclosure, this method may be modified in order to derive alternative embodiments. Also, the steps in this embodiment are shown in sequential order. However, certain steps may occur in a different order than shown, certain steps may be performed concurrently, certain steps may be combined with other steps, and certain steps may be absent in another embodiment. Method 1700 is described with reference to variations of the elements described in connection with FIGS. 7 and 11. In one embodiment, the method of FIG. 17 implements at least a portion of element 1602 of FIG. 16. In one embodiment, the method of FIG. 17 is implemented when calculating node rankings of each node. In one implementation, the method of FIG. 17 can be implemented when generating an n-ary tree.

In element 1702, one or more nodes is filtered out. As noted, when node rankings are calculated for each node, some of the nodes may be filtered out before the n-ary tree is build, e.g., to save computational bandwidth. Such nodes may be filtered out if the calculated node rank is lower than some threshold and/or a range. In one embodiment, a certain lowest percentage of nodes (e.g., the bottom 10% of all nodes) are filtered out.

In element 1704, the n-ary tree can be build. It is noted that in some embodiments, the n-ary tree can be build without executing element 1702.

Figure 18:
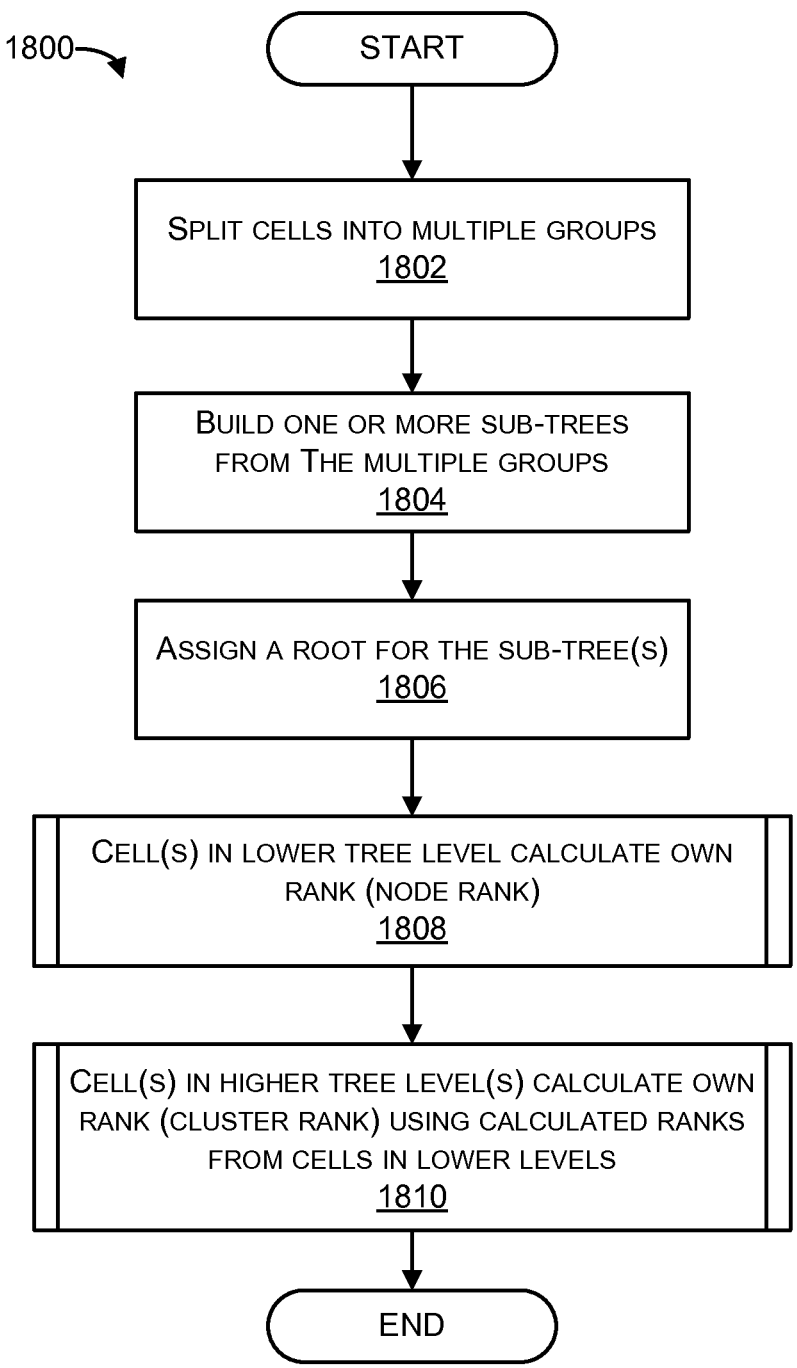
FIG. 18 is another flowchart illustrating a method for generating an n-tree when selecting a cluster and/or a node using virtual machine configuration, according to one embodiment.

FIG. 18 is a flowchart 1800 of a method for generating of a n-ary tree, according to one embodiment. As will be appreciated in light of the present disclosure, this method may be modified in order to derive alternative embodiments. Also, the steps in this embodiment are shown in sequential order. However, certain steps may occur in a different order than shown, certain steps may be performed concurrently, certain steps may be combined with other steps, and certain steps may be absent in another embodiment. Method 1800 is described with reference to variations of the elements described in connection with FIGS. 7 and 11. In one embodiment, the method of FIG. 18 implements at least a portion of element 1602 of FIG. 16 and/or element 1704 of FIG. 17.

In element 1802, cells may be split into multiple groups. When generating an n-ary tree, each node (e.g., in the clusters being considered) can be represented by a cell.

In element 1804, one or more sub-trees may be built from the multiple groups. The second level tree nodes can be added to be a sub-root node for each sub-tree. Each such sub-root node, e.g., node 1502B, 1502E, and 1502I, can represent a cluster. For example, with reference to FIG. 15, a first sub-tree can include nodes 1502B-1502D, a second sub-tree can include nodes 1502E-1502H, and a third sub-tree can include nodes 1502I-1502L. Thus, the first sub-tree can include nodes for the first cluster (e.g., 1400A), the second sub-tree can include nodes for the second cluster (e.g., 1400B), etc. In other embodiments, the tree nodes in the sub-trees can be grouped by subnets, or geographical proximity of nodes, etc.

In element 1806, a root node may be assigned for the sub-trees. Such a root node can connect all of the sub-trees together. For example, referring to, e.g., FIG. 15, node 1502 is the root node for n-ary tree 1500.

In element 1808, each cell (e.g., each tree node) in the lower tree level can calculate its own node rank. For example, the tree nodes in the lower tree level represent nodes. Agent(s) associated with each such node (e.g., agent 410A associated with node 1402A that is represented by tree node 1502C) can calculate its own node rank. In one embodiment, once the node ranks are calculated, some tree nodes are filtered out (e.g., if the node rank is below a certain threshold and/or is outside a certain range) before proceeding to the next element in method 1800.

In one embodiment, VM configuration requirements is communicated to the root node of the N-ary tree. Every non-leaf node in the N-ary tree can divide the work among its children and find its own available capacity and ranking. Each node (that is represented by each tree node) can calculate its node rank by running an algorithm. This algorithm can consider i) virtual machine's requirements (CPU, Memory, availability, data protection, storage, security, etc.), ii) the node's estimated available capacity for each resource; and iii) and the data center (e.g., save power, high performance), cluster, host & virtual machine (e.g. guaranteed resources, affinity, non-affinity, etc) policies. In one implementation the estimated available capacity is calculated using analytical techniques such as self-learning or forecasting on resource usage & static policies.

In element 1810, each cell (e.g., each tree node) in the second tree level calculates its own cluster rank. For example, the tree nodes in the lower tree level represent nodes. Agent(s) associated with each such node (e.g., agent 410A associated with node 1402A that is represented by tree node 1502C) can calculate its own node rank. In one embodiment, agent(s) of a cluster can also implement any computation for the second level tree node(s). For example, agent 1410A can also implement the computation(s) for element 1810.

Figure 19:
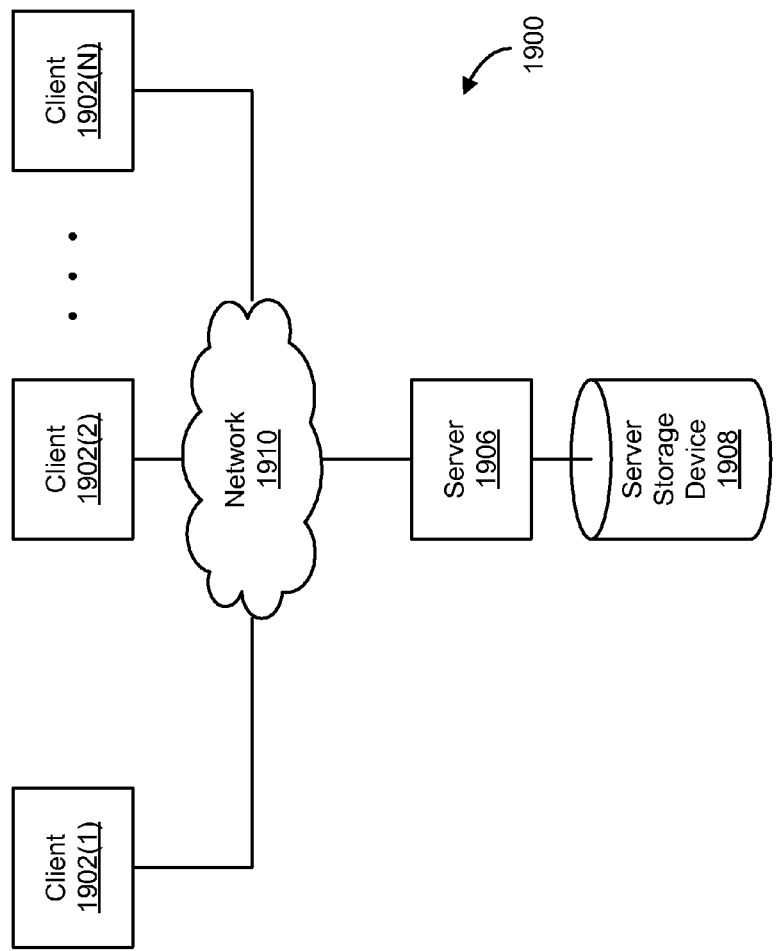
FIG. 19 is a block diagram illustrating a network architecture in which embodiments of the present application can be implemented.

Elements of network architecture can be implemented using different computer systems and networks. An example of one such network environment is described below with reference to FIG. 19. FIG. 19 is a simplified block diagram illustrating a network architecture 1900 in which one or more clients are provided with access to a server via various network connections. As depicted in FIG. 19, clients 1902(1)-(N) are coupled to a network 1910, and so are able to access a server 1906 (which can be used to implement node(s) of FIGS. 1, 7, 14 and/or notification controller) via network 1910. Other servers (not shown) can be used instead to implement system(s) node(s) of FIGS. 1, 7, 14 and/or notification controller). A client can be implemented using, for example, a desktop computer, a laptop computer, a workstation, a server, a cell phone, a smart phone, a network-enabled personal digital assistant (PDA), or the like. An example of network 1910, which can be used by clients 1902(1)-(N) to access server 1906, is the Internet. Alternatively, access to server 1906 can be provided by a local area network (LAN) utilizing Ethernet, IEEE 802.11x, or some other communications protocol. As will be appreciated, server 1906 can be accessed by clients coupled directly thereto (not shown).

As also depicted on FIG. 19, server 1906 is coupled to a server storage device 1908, which includes a data volume such as cluster shared volume. Server storage device 1908 can be implemented as a single storage device or a collection of storage devices. Server storage device 1908 can also be implemented as a storage area network, which couples remote storage devices to a server (e.g., server 1906), such that the remote storage devices appear as locally-attached storage devices to the server's OS, for example.

In light of the present disclosure, those of skill in the art will appreciate that server storage device 1908 can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives and the like. Alternatively, those of skill in the art will also appreciate that, in light of the present disclosure, network architecture 1900 can include other components such as routers, firewalls and the like that are not germane to the discussion of the present network and will not be discussed further herein. Those of skill in the art will also appreciate that other configurations are possible. For example, clients 1902(1)-(N) can be directly coupled to server storage device 1908 without the user of a server or Internet; server 1906 can be used to implement both the clients and the server; network architecture 1900 can be implemented without the use of clients 1902(1)-(N); and so on.

As an example implementation of network architecture 1900, server 1906, services requests to data generated by clients 1902(1)-(N) to data stored in server storage device 1908. Any of the functionality of the nodes, agents, and/or administration modules can be implemented using one of the other servers in the manner illustrated by FIGS. 1, 7, 14.

Figure 20:
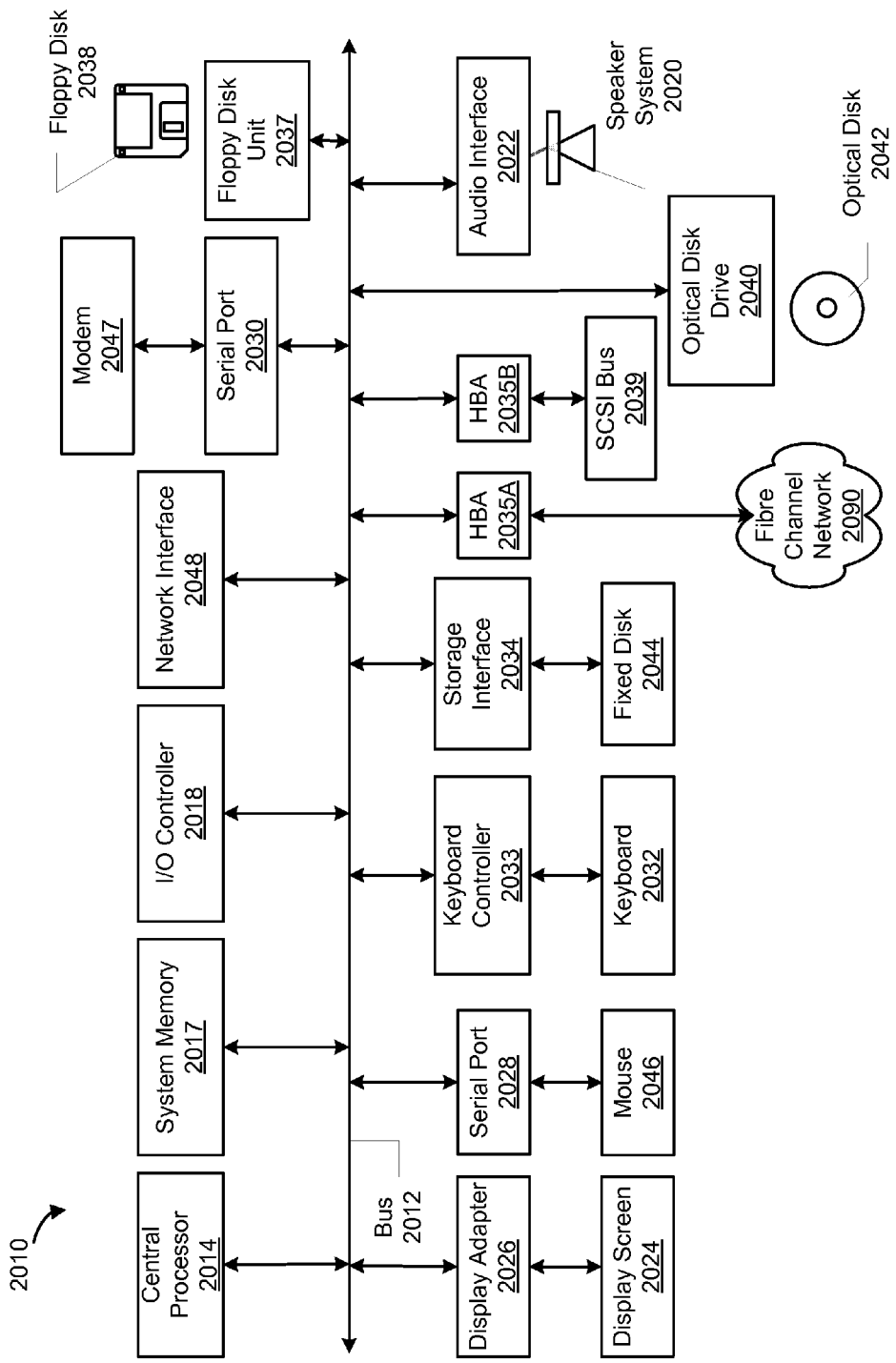
FIG. 20 is a block diagram that illustrates an example of a computer system suitable for implementing embodiments of the present application.

FIG. 20 depicts a block diagram of a computer system 2010 suitable for implementing the present disclosure. Computer system 2010 may be illustrative of various computer systems in the networked system of FIGS. 1, 7, 14, such as node(s) and/or notification controller, among others. Computer system 2010 includes a bus 2012 which interconnects major subsystems of computer system 2010, such as a central processor 2014, a system memory 2017 (typically RAM, but which may also include ROM, flash RAM, or the like), an input/output controller 2018, an external audio device, such as a speaker system 2020 via an audio output interface 2022, an external device, such as a display screen 2024 via display adapter 2026, serial ports 2028 and 2030, a keyboard 2032 (interfaced with a keyboard controller 2033), a storage interface 2034, a floppy disk drive 2037 operative to receive a floppy disk 2038, a host bus adapter (HBA) interface card 2035A operative to connect with a Fibre Channel network 2090, a host bus adapter (HBA) interface card 2035B operative to connect to a SCSI bus 2039, and an optical disk drive 2040 operative to receive an optical disk 2042. Also included are a mouse 2046 (or other point-and-click device, coupled to bus 2012 via serial port 2028), a modem 2047 (coupled to bus 2012 via serial port 2030), and a network interface 2048 (coupled directly to bus 2012).

Bus 2012 allows data communication between central processor 2014 and system memory 2017, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 2010 are generally stored on and accessed via a computer readable medium, such as a hard disk drive (e.g., fixed disk 2044), an optical drive (e.g., optical drive 2040), a floppy disk unit 2037, or other storage medium. Additionally, applications can be in the form of electronic signals modulated in accordance with the application and data communication technology when accessed via network modem 2047 or interface 2048.

Storage interface 2034, as with the other storage interfaces of computer system 2010, can connect to a standard computer readable medium for storage and/or retrieval of information, such as a fixed disk drive 2044. Fixed disk drive 2044 may be a part of computer system 2010 or may be separate and accessed through other interface systems. Modem 2047 may provide a direct connection to a remote server via a telephone link or to the Internet via an internet service provider (ISP). Network interface 2048 may provide a direct connection to a remote server via a direct network link to the Internet via a POP (point of presence). Network interface 2048 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 20 need not be present to practice the present disclosure. The devices and subsystems can be interconnected in different ways from that shown in FIG. 20. The operation of a computer system such as that shown in FIG. 20 is readily known in the art and is not discussed in detail in this application. Code for the automatically performing operations on such applications based on their dependencies on other applications (such as described above with reference to the methods of FIGS. 5, 6, 12, 13, and 16-18), etc., to implement the present disclosure can be stored in computer-readable storage media such as one or more of system memory 2017, fixed disk 2044, optical disk 2042, or floppy disk 2038. Memory 2020 is also used for storing temporary variables or other intermediate information during the execution of instructions by the processor 2010. The operating system provided on computer system 2010 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Aspects of the disclosure are also discussed in the Appendix. Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

APPENDIX

Resource requirements of a set of virtual machines can be packaged together (e.g. OVF format) using a requirement template to make the virtual machine portable. The resource requirement associated with each virtual machine's can include additional requirements, including data protection and security requirements. Placement of (e.g., provisioning) the virtual machine can use this template to filter hosts based on their capability to meet not only the resource and availability requirements, but also the data protection and the security requirements. Also, the software on the capable hosts can be appropriately configured to meet the data protection and security SLAs during the placement.

A virtual machine's requirement template is defined as an aggregate of its resource, availability, data protection and security requirements. For example, when the virtual machine's SLA requirements are defined, VM's data protection and security SLA requirements can be also defined in the virtual machine's template (along with any other requirements of the virtual machine), including:

A) Resource requirements define the various resource requirements of the virtual machine e.g. CPU, Memory, Network, Platform, OS, Boot disk image, etc. requirements can be defined as part of the virtual machine's resource requirements.

B) Availability requirements defines the availability requirements of the virtual machine e.g. the number of physical host failures that the virtual machine needs to be able to tolerate, the number of remote sites configured for the virtual machine's disaster recovery.

C) Data Protection Requirement defines the frequency, media and method/type for the backup or the snapshot of the virtual machine.

D) Security Requirement defines the security zones for the virtual machine to restrict the networks that the virtual machine will have access to, policies and frequency for malware scanning, etc.

When a host (e.g., a node) is evaluated on its capability to place the virtual machine, along with other criteria, the availability, data protection, and/or security SLAs can be considered.

Matching the Data Protection Requirements could include: Determine the backup application to meet data protection requirement. Generally this is standardized in a data center. Determine if the physical server chosen to place virtual machine has connectivity to the right backup server (e.g. media server, master server in case of NBU).

The right backup server is determined by other data protection SLAs. This includes whether the backup server has the required media to backup the virtual machine data, whether it supports the protection method (frequency of backup, method of backup—e.g. agent based, off-host snapshot based, CDP etc)

Matching the Security Requirements could include:

a) Checking if the host has appropriate firewall settings. Typically, security zones are created based on firewall settings and based on the SLA description of the virtual machine, the physical host should belong to a particular security zone.

b) Checking if the malware and DLP scan is appropriately configured either within the guest boot image, or on the physical host, or on the data-store where the boot image is kept, etc.

Once a list of potential hosts is generated, where these potential hosts are capable of meeting the virtual machine's requirements, one host can be selected based on various criteria, such as best match, power saving, and/or first match, etc. The selected host is then configured so that it can meet the availability, data protection, and/or and security SLAs.

Configuring the host for meeting the Data Protection SLAs could include:

a) Determining if the virtual machine image has the required backup software (e.g. agent) incorporated. If not, this discrepancy can be reported, and this software can be installed, such as automatically (in response to detecting this discrepancy).

b) Setting up the backup/snapshot configuration e.g., setting up appropriate policies for data protection in the backup software Configuring the host for meeting the Security SLAs could include setting up malware scans using appropriate software at required intervals, setting up firewall settings, etc.

The templates that are used to define the virtual machine's requirements contain the resource, availability, data protection and security requirements for the virtual machine. Such template can not only be used for finding a place for the virtual machine, but also to manage the virtual machine after it is placed, to ensure that the intent with which the virtual machine was created is met during the virtual machine's life.

In some embodiments, four steps can be implemented to manage and provision a virtual machine.

Step1: A virtual machine's requirement template is defined as an aggregate of its resource, availability, data protection and security requirements.

Step2: A host is selected based on its capability to meet all the virtual machine's requirements. Also, some requirements may also require configuration on the selected host to be able to meet the virtual machine's SLAs e.g. setting up cron job for backup, malware scan, etc.

Step3: Virtual Machine is provisioned on the selected host.

Step4: In order to ensure that the SLAs with which the virtual machine was created are met during the virtual machine's life, an event based or a polling mechanism can be implemented to detect any drifts in the virtual machine's requirements from the virtual machine's requirement template. For example, such an even based mechanism can use notifications.

Availability template could define that the virtual machine needs to be able to tolerate three physical host failures, and at least one physical host needs to be available for failover. If the system detects that any of the physical hosts providing availability to the virtual machine is down (e.g., via an agent), the administrator can be warned. Also, if no physical host is available for failover, the virtual machine can be placed on some other cluster that will be able to meet the virtual machine's availability and other SLAs.

Security template could define that the virus definition needs to be updated every day. If the system (e.g., agent) finds that the host where the malware scan is installed has stale virus definitions, the administrator can be warned. Also, appropriate action can be taken to update the virus definition file. Another example: Security template could define that the virtual machine's network needs be protected using firewall from public network. If the system detects that the firewall settings on the host have changed leading to the virtual machine having access to the public network, the administrator can be warned and/or some action can be taken.

Data Protection template could define that the backup needs to be done every 4 hours. A failure of the backup job can be detected, and the administrator can be warned if the backup job fails.

In order to find whether a given physical host is capable of hosting the virtual machine, a combination of static and dynamic parameters can be used. An example of static parameters is guaranteed minimum resources, and an example of dynamic parameters is resource usage on each physical host for the decision-making. The resources are monitored on each physical host and the statistics and forecast analysis can be maintained locally on each host. The static parameters and the dynamic parameters (statistics) can be used by each host to evaluate its rank.

At the cluster level, the ranking of the cluster is calculated using the ranking of its constituent hosts. For distributed decision-making, an N-ary tree is build from the hosts in the datacenter for efficient distribution of the work. Each non-leaf node in the N-ary tree distributes work to its children and the aggregation and reconciliation of result happens at each non-leaf node before it passes the information to its parent, and finally the information reaches the root of the N-ary tree.

The N-ary tree can be built bottom-up. First, a sub-tree is created for the hosts belonging to the same cluster. This helps in keeping cluster level decision making local to each cluster. Then, the higher level is build by grouping cluster subtrees whose roots belong to the same subnet together. Then, the roots of the subnet trees are grouped under the same root.

This algorithm to build N-ary tree takes the optimal value of the max-fanout for the inter-host communication protocol as input to restrict the maximum children any non-leaf node can have. If a cluster level or a subnet tree has a host with more than N children, the tree under it is restructured to ensure that no host has more than N children. The restructuring of the tree also maintains the cluster & subnet grouping. Also, when information reaches a cluster subtree's root, it is processed & reduced before sending upwards. Thus, the information is aggregated at cluster level.

In some embodiments, the following is a method to place a set of related virtual machines (e.g., a multi-tier application) in a virtual data center.

1. Organize data center into a number of clusters.
2. For each virtual machine in the set of related virtual machines to be placed, do the following:
   a. Based on certain characteristics of the virtual machine to be placed (e.g. platform), prune the list of clusters.
   b. Among the list of clusters (at the end of step 2), determine a list of clusters that can accommodate the virtual machine meeting certain SLAs, examples of which are—
      i. There is a required spare capacity (CPU, memory, N/w bandwidth, storage) on at least one host in the cluster
      ii. It has required connectivity (N/W connectivity, storage connectivity)
      iii. The cluster can meet availability criteria (requires capacity to be reserved on alternate hosts in the cluster)
      iv. The cluster can meet DR requirements
      v. The cluster can meet the data protection & security requirements.
3. At this time, the list of clusters is determined. The clusters in this list meet certain SLAs for the set of virtual machines to be placed. Further, apply following criteria on this list to come up with exact clusters to place the related virtual machines on—
   c. There should be network connectivity between the clusters (related virtual machines need to interact with each other)
   d. The policy of data center (best performance or best consolidation). If policy is best performance, choose the cluster set that allows more spare capacity on the chosen clusters after placement. If policy is best consolidation, choose the set of clusters that allows least spare capacity after placement.
   e. Other policies like guaranteed minimum resources, virtual machine affinity to certain hosts/clusters, two virtual machines that should not be placed on some host/cluster, etc.

For placing multiple multi-tier applications, the above process can be repeated for each multi-tier application. Since this algorithm needs to be scalable, following is one algorithm that allows distributed computing for decision making.

1) Virtual machine requirements are defined in a template format.
2) N-ary tree is built from the hosts in the clusters that can potentially (e.g. same platform) host the virtual machine. The N-ary tree is build such that hosts in the same cluster are grouped under the same sub-tree. This helps in localizing cluster level decision making within the cluster. Also, clusters can be placed in the same subnet into the same sub-tree. This also helps in reducing network chatter.

3) Virtual machine requirements are given to the root of the N-ary tree. Every non-leaf node in the N-ary tree divides the work among its children & finds its own available capacity and ranking by running the map function. The map-function run on each host calculates its rank by running an algorithm that considers the i) virtual machine's requirements (CPU, Memory, availability, data protection, storage, security, etc.), ii) the host's estimated available capacity for each resource using analytical techniques like self-learning & forecasting on resource usage & static policies iii) and the data center (e.g. save power, high performance), cluster, host & virtual machine (e.g. guaranteed resources, affinity, non-affinity, etc) policies.

4) Once each non-leaf node receives the results (ranking) from its children and self, it aggregates and reconciles the results to make upward recommendation to its parent. This is the reduce function to aggregate results at cluster level & higher levels to give upward recommendation for higher ranked clusters & hosts within the clusters.

5) Finally, the results reach the root of the tree. Thus, the root of the tree can access a list of suitable clusters (& hosts within the clusters), where these clusters/hosts that are highly ranked for placing the virtual machine.

Below is described another embodiment, for a distributed decision-making mechanism to find out the cell-blocks in the data center that meet a given virtual machine's resource and availability requirements. The distributed decision-making ranks the cell-blocks for their ability to host the given virtual machine based on the Data Center's Uber policy (save power, high-performance, manual etc.). The virtual machine can then be placed on one of the high ranked cell-block. The key heuristics and algorithms used for implementing this distributed decision-making are explained in this document.

A template based interface is provided that provisions business services. Each business service template is an aggregate of its application tier templates. Each application tier template consists of its container virtual machine template, storage template, network template and the application parameters template. These templates can be defined based on each business service's SLA requirements. The system also can include pre-defined templates for quick provisioning. The Business Service templates will be the input to our distributed algorithm to find the cell-blocks in the data center that can satisfy the various resource and availability characteristics defined in these templates.

DEFINITIONS

Cell: A physical machine capable of hosting virtual machines.

Cell-block: Cluster of cells grouped together to maintain high availability for the VMs running on its constituent cells using any compatible HA technology e.g. VMware HA, VCS HA etc. The application availability is handled using an architecture technology like Application-HA.

Business Service: A collection of related applications having well defined dependencies. For e.g. a three-tier implementation with a web-tier, application-tier and database-tier working in tandem to support an end user use case. Each of the application within a Business Service can potentially run on different platform and can have different load characteristics.

Application: Each of the components of a Business Service is called an Application.

Virtual Machine: The standard virtual machines running on physical machines. Each of the virtual machine can be running one or more applications. One or more virtual machine can exist on each of the cell.

CMS: VOM Central Management Server

MH: Managed Host. A cell (physical host) which is being managed through the VOM CMS.

Input for the Distributed Decision-Making

The Business Service template can be translated into the following lower level resource and availability requirements of each virtual machine:

Resource requirements for the virtual machine:
a. Platform
b. CPU requirement—minimum & desired
c. Memory requirement—minimum & desired
d. IO & connectivity to a type of storage
e. Network requirement—number of links, isolation???

Availability requirement:
a. Standalone (non-clustered) virtual machine: Desired and minimum number of mirrors to meet the availability SLA for the virtual machine in case of cell failures.
b. Cluster of virtual machines: The desired & minimum reservations for the cluster to meet the availability SLA in case of cell failures. For an N member cluster with M reservations, this translates to finding appropriate cell-block with at least N+M cells that can host a virtual machine of the cluster. Out of the N+M reservations, N virtual machines will be active & M reserved/inactive. We assume that all the virtual machines forming the cluster are homogeneous.

Advanced analytical techniques can also be used to find the available capacity on each cellblock. The capacity of each cellblock is calculated on demand using a scalable distributed mechanism Workflow for the Decision Making In order to find the cell-blocks that meet a virtual machine's resource and availability requirements following high-level steps are used:

Basic Filtering: [Local step on CMS]: Use the database at the central server to do the first-level filtering of the cell-blocks that can potentially meet the virtual machine's resource & availability requirements. For example,
 Exclude cell-blocks that do not meet the platform criteria
 Exclude cell-blocks that do not have enough cells to meet the VM's availability requirements.
 Exclude cell-blocks that are not connected to appropriate storage tier.

Build N-ary tree: [Local step on CMS]: Build an N-ary tree (N determines the max fan out and is an input parameter for the algorithm) from the above filtered list of cell-blocks based on the subnet and cellblock grouping. Each cell in the N-ary tree is assigned a unique task-id. This N-ary tree can be used recursively for the determining the suitability of each of the cell block to provide the virtual machine's requirements, with aggregation and reconciliation of result happening at each non leaf node of the N-ary tree. The detailed algorithm used to build the N-ary tree is explained in the section: Algorithm to build the N-ary tree.

Build Payload file: [Local step on CMS]: Combine the VM's resource & availability requirements, cellblock membership information and the N-ary tree into a single JSON file. This file is used as input for the distributed decision making to find the cellblocks that meet the VM's resource & availability requirements.

Match & Rank Cell-blocks: [Distributed step run on all cells in the N-ary tree created above]: This uses our infrastructure for distributed map-reduce. The map function is run on each node/cell in the N-ary tree. The map function finds the cell's match for the virtual machine's resource requirements.

The reduce function is run on each non-leaf node in the N-ary tree. The reduce-fn checks if it has map output from all the cells in a cell-block. If yes, it finds the cell-block's match for the virtual machine's resource and availability requirements. The details of map & reduce functions are described in the section: Map and Reduce logic for finding cell-block match.

Next, each cell-block's rank is calculated based on the Uber policy for the distribution of virtual machines. Examples of Uber policy are: save power by consolidating many virtual machines on minimum number of cells, distributes virtual machines across maximum cells for high performance, manual selection, etc.

Algorithm to Build the N-Ary Tree

The N-ary tree is build bottom-up. First, we create a sub-tree for the cells belonging to the same cell-block. Then, we build the higher level by grouping cell-block subtrees whose roots belong to the same subnet together. Then, we group the roots of the subnet trees under the same root. This algorithm takes MAXFANOUT as input to restrict the maximum children any non-leaf node can have. This recursive logic is explained below:

Algorithm to Create an N-Ary Tree from Input Cells $(C_1 \ldots C_x)$

To arrange cells $(C_1 \ldots C_x)$ in an N-ary tree (any node can have at the most N children) we execute following steps:

STEP 1: The cells in the are split into multiple groups $G_1 \ldots G_n$ such that each group has N+1 cells except for $G_1$, which might have <(N+1) cells.

For each of the group $G_1 \ldots G_n$, choose the cell with lowest id as the parent node and have rest of the N cells as the children. At the end of this step we have n trees each having N cells (1 parent+N−1 children) except for $G_1$, which has one parent and <N children (let's say it has "a" children). Note that we have chosen the lowest id as the parent just to simplify the explanation of the algorithm. The algorithm doesn't assume anything and would work if any random node from the group is chosen as the parent.

STEP 2: The second step is to link all of these n independent trees into a single tree. There are 2 possibilities . . . n>N or n<=N Case 1: n<=N. In this case we should be able to have all of $G_1 \ldots G_n$ as the children of a single node (we get a tree of depth 3). The way it is done is to pick up root the tree with the lowest number of children (root $C_1$ or tree $G_1$ in our example) and pull up to make it the parent of $G_2 \ldots G_n$ as well. However to keep the N-aryness of the tree we have to check if the original number of children plus the new children are less than N or not.

Base Condition: If (a+n−1)<=N→Done. We have a single tree rooted in $C_1$.

Recursive Condition: If (a+n−1)>N, Then we simply make one of the original child of $C_1$ inherit all its children (let's say $C_2$) and have $C_1$ as the parent of $C_2$ and the roots of $G_2 \ldots G_n$.

Case 2: In the case of n>N, we simply divide $G_1 \ldots G_n$ into groups $H_1 \ldots H_m$ of N each and do Step2 on each of these $H_1 \ldots H_m$ groups until we get everything into the same tree Steps to Build the N-Ary Tree Group by Cellblock: For each cellblock, consider its cells $(C_1 \ldots C_n)$ as the input for the algorithm mentioned above and execute it. At the end of it we have one N-ary tree per cell-block.

Group by Subnet: For each subnet, consider the roots of each of the cellblock tree created above as the input $(G_1 \ldots G_n)$ for the Step 2 of the algorithm mentioned above and execute it. At the end of it we have one N-ary tree per subnet.

Assign N-ary tree's root: Consider the roots of each of the subnet tree $(G_1 \ldots G_n)$ as the input for the Step 2 of the algorithm mentioned above and execute it. At the end of it we have our final N-ary tree and its root.

Below is one example implementation:

| Script | build_nary_tree_sn_cb.pl | Input: Dataset is a text file with one row for each cell-block. Each row has the cell-block name, number of cells in the cell-block, list of cells in the cell-block. Maximum fan-out Output: N-ary tree in JSON format. |
|---|---|---|
| Test Script | test_build_nary_tree_sn_cb.sh | Runs for several dataset inputs & MAXFANOUT values. Each dataset has varying number of subnets, cellblocks, cells in cell-blocks. It tests following: Ensures that the cells in the N-ary tree & the dataset are exactly the same. Ensures that no parent has more than MAXFANOUT children. |

Algorithm for Distributed Map-Reduce

We have implemented a generic infrastructure to run distributed map-reduce kind of tasks on a set of hosts. This infrastructure uses the N-ary tree created above for the recursive distribution of decision-making to find the cell-blocks that match the virtual machine's resource & availability requirements. Essentially, each cell divides the task, assigns it to its children & self, gathers the results from its children and self & makes upward recommendation. Finally, the root of the N-ary tree will have the recommendation from all the cells in the N-ary tree Communication Across Cells Our in-house xprtld (light-weight web server) and xprtlc (http client) are used for the communication across cells.

All the cells have VOM's MH package installed and are registered at the same CMS for the agent to agent communication to work across the cells. The map-reduce distributed decision-making code is installed on /opt/VRTSsfmh/web/agent/cgi-bin/mapreduce/ on all the cells.

Payload

The input to this heuristics is encoded in JSON. The JSON file has two parts:

N-ary tree of the cells participating in the distributed decision making.

Input for the Map & Reduce tasks. This can be specific to each map & reduce task and is not interpreted by the distribution and callback routines.

Files

Each host has a directory /var/opt/VRTSsfmh/MR/ where all the intermediate and final output files for the distributed map-reduce infrastructure are placed. Each file is appended by the task-id of the local host. The key files are:

| Watchfile | watchfile.$taskid | This file is updated by the local host's callback_nary_tree( ) and is read/watched by the local host's distribute_nary_tree( ). |
|---|---|---|
| Outfile | outfile.$taskid | This file is updated by the local host's reduce_fn( ) with the consolidated reduced output. |

Distribution Logic

The key functions implemented in the distributed map-reduce heuristics are:

distribute_nary_tree( ): This function is used for the distribution of work. CMS calls the distribute_nary_tree( ) for the root of the N-ary tree. Each non-leaf cell in the N-ary tree calls distribute_nary_tree( ) for its next-level hosts.

Input: N-ary sub-tree rooted at the cell whose distribute_nary_tree( ) is called, Input specific to map/reduce tasks.

Logic: This function executes following steps:
Spawns a thread to call local host's map_fn( ).
For each of its next-level hosts in the N-ary tree:
  Extract out the N-ary sub-tree rooted at the next-level host
  Spawns a thread to call the next-level host's distribute_nary_tree( ) with above extracted N-ary sub-tree and the input for the map & reduce tasks as JSON payload.
Waits for all the spawned threads (next-level hosts and the local map_fn) to respond by watching a watch-file updated by the callback_nary_tree( ) routine.
Once all the spawned tasks respond or the timeout occurs, it calls its parent's callback_nary_tree( ) with the consolidated output created by its local reduce_fn( ).
callback_nary_tree( ): This is the callback function. Each child cell calls its parent cell's callback function when it receives output from all its children or if timeout occurs. Each cell's local map function also calls self's callback function to indicate completion of work done as part of map logic.

Input: The payload file has the reduce output from the child node, or the map output from the self node in JSON.
Logic: This function executes following steps:
Calls local host's reduce_fn( ) with the received payload. The received payload can be local host's map output or any of the next-level host's reduced output.
Updates the watch-file with the taskid of the host from which it received the payload.
map_fn( ): This function is called by the local host's distribute_nary_tree( ).
Logic: This function executes following steps:
Runs the map-logic on local host.
Calls the local-host's callback_nary_tree( ) with the map-output as payload.
reduce_fn( ): This function is called by the local host's callback_nary_tree( ) with the payload file received by callback_nary_tree( ).
Steps: This function executes following steps:
Reads the input payload (map output from local host or reduce output from next-level hosts).
Reads the existing contents of output-file (previous reduced output).
Runs the reduce logic on combined received payload and the previous reduced output.
Updates the output file with the new reduced output.
Below is one example implementation:

| Script | MRcommon.pm, MRdistribute.pm, mr_uname.pl mr_uname_sleep.pl | MRcommon.pm: common module that contains common functions for debugging, untaint, calling xprtlc, etc. MRdistribute.pm: common module containing definition of distribute_nary_tree( ) and callback_nary_tree( ). mr_uname.pl: Uses default map_fn( ) and reduce_fn( ). Default map_fn( ) is to dump `uname -a` output. Default reduce-fn( ) aggregates map outputs. mr_uname_sleep.pl: Uses default map_fn( ) and sleeps for 10s. Uses default reduce-fn( ). |
|---|---|---|
| Test Script | mr_uname_*.sh Simulation Testing: test_localhost_manyxprtlds.sh test_manyhosts_manyxprtlds.sh | Tests default map_fn( ) - `uname -a` output and default reduce_fn( ) - aggregate uname -a output |

Map & Reduce logic for finding the cell-block match: The map & reduce functions for finding the cell-block match take the VM's resource & availability requirements as input.
Payload: The input to this heuristics is encoded in JSON. The JSON file has two parts:
N-ary tree of the cells participating in the distributed decision making.
Input for the Map & Reduce tasks: VM's resource & availability requirements: min/desired CPU, memory, mirrors. Each cellblock's membership information.
Map Function
Gets the cell's available and total CPU & Memory information on the cell. These will be discrete values for LDOM kind of virtualization technologies. For KVM/VMware kind of virtualization technologies, these will be calculated using heuristics that consider actual resource usage, SLAs & allocations.
Reads the VM's resource requirements.
Finds the cell's resource match for each resource. Currently we find match only for CPU & Memory. For each resource, map function outputs two things: a) Whether it got minimum or desired match; and b) The match value e.g. VM requires minimum 8 GB RAM and desired is 12 GB RAM. If the cell has 9 GB available RAM, match for memory will be 9 GB.
Reduce Function
We have currently implemented a good-enough reduce function. We can further refine it later. It executes following steps:
Reads and consolidates the received input and the existing reduced output file.
Finds if any of the cell-blocks has map output from all its cells. We have an optimization to check this only for cell-blocks that have cells in the received input. Also, we don't evaluate cell-block match for the cell-blocks that have already been evaluated.
For all the cell-blocks that have map output from all the constituent cells, it evaluates the cell-block's match. Following are the steps for LDOMs. KVM steps will differ slightly; with KVM, we will also do pre-processing for the cells to evaluate cell's match based on reserved allocations as well.
Finds the number of cells in the cell-block that meet at least the minimum resource (CPU & memory) requirements.
If the count is less than minimum required mirrors, it marks the cell-block as not matching and does no further processing on the cell-block.
Else, it sorts the cells in following order:
  cells that meet both desired memory & desired CPU requirement
  cells that meet desired memory & minimum CPU requirement
  cells that meet minimum memory & desired CPU requirement
  cells that meet minimum memory & minimum CPU requirement
Based on the desired & minimum mirrors required, pick up the first N cells in the above sorted list. (desired mirrors>=N>=minimum mirrors)

Dump the cell-block's match (mirrors, CPU, memory) and the information about the top N matching cells into the reduced output file.

Below is one example implementation:

| | | |
|---|---|---|
| Script | MR_capacity.pm, mr_ldom.pl | MRcapacity.pm: common functions for various virtualization technologies<br>mr-ldom.pl: Implements map & reduce functions for LDOMs. Most of the reduce logic is common. |
| Test Script | mr_ldom_*.sh<br>Simulation Testing: test_ldom_mr_onehost.sh | Tests LDOM map & reduce logic. |

Simulation Mechanisms for the Test Infrastructure

Simulation can be used to simulate various resources.

Distributed Map-Reduce Scalability Testing

Start many xprtld processes on each host. Each xprtld listens on a different port, uses its own access log, error log and PID file. While building the N-ary tree give the host-id as each xprtld instance's URL. Script: test_localhost_manyxprtlds.sh, test_manyhosts_manyxprtlds.sh.

LDOM Cell-Block Match Testing

For the LDOM capacity match testing, in addition to above xprtld instances, we also assign capacity to each xprtld. This is achieved by creating a file (with unique filename for each xprtld's port number) that contains total and available CPU & Memory for the simulated cell.

If the simulate_capacity flag is set in MRcapacity.pm, the LDOM map function (map_ldom( ) in mr_ldom.pl) does not call the Solaris ldm commands to get the cell's capacity. Instead it reads the capacity from the simulation file created above.

Script: test_ldom_mr_onehost.sh

Creation of Datasets with Many Subnets & Cell-Blocks

We have collected information about the IP addresses from our labs (Files: Pune_Subnets.txt, MTV_Subnets.txt). For the creation of the dataset, we use multiple subnet counts for each dataset. The subnet count defines the maximum number of subnets in the dataset. For each subnet, we choose random number of cellblocks. For each cellblock, we choose random number of cells. For each cell, we pick an IP from the IP address information files. We dump the cellblock and its member cell information into the dataset file. Script: generate_sample_data.p.

Business Service Templates

We plan to provide template based interface to provision business services. Each business service template will translate into an aggregate of its application tier templates. Each application tier template consists of its container virtual machine template, storage template, network template and the application parameters template. These templates can be defined based on each business service's SLA requirements. We can also have pre-defined templates for quick provisioning.

Details of Virtual Machine Resource Requirements

Following are the details of the input parameters used to decide the most appropriate cell block to place a standalone virtual machine or a cluster of virtual machines:

Virtual Machine: Platform Requirement

A given virtual machine might require say Solaris 10 LDOM on Sparc or say RHEL6 virtual machine on x86_64 or say Windows XP on x86_64. This is an example requirement that will reduce the scope of the cell-blocks that can be used to deploy the virtual machine. Not much dynamic decision making will be required for this. We can implement it as a table lookup to know which all cell blocks (mainly depends on the platform & virtualization technologies) are capable of hosting a given platform's VM e.g. Windows XP x86_64 VM can be hosted on both VMware ESX cells and RHEV/RHEL KVM cells.

Virtual Machine: CPU Requirement

A given virtual machine will have some CPU requirement e.g. Need to place a Solaris LDOM with 4 cores. In that case, we will need to look at the available capacity of each cell-block and decide which all cell-blocks are capable of meeting the virtual machine's CPU requirements.

The unit of allocation of CPU can vary from one virtualization technology to another e.g. LDOMs usually allocate CPUs in units of cores or threads, KVM & VMware usually allocate CPU in units of VCPUs (virtual CPUs). Allocation of CPU falls into two broad categories based on the virtualization technology:

1. Discrete: Example: Solaris LDOMs where the cores are exclusively allocated to each VM 2. Shared: Example: KVM, VMware where the same cores can be allocated to multiple VMs and the VMs share the cores. AIX LPARs where the CPUs can be micro-partitioned to up to 10% e.g. a given LPAR can get say 0.4 CPU.

Allocating cores for discrete allocation is quite straightforward as we can allocate only the free CPU units. Allocating CPU for shared allocation will require more intelligence to refine the over-commitment of each CPU such that there is a good balance of meeting the CPU requirement for the virtual machine as well as having optimal utilization of the CPU. We use resource-monitoring & forecasting techniques to find the available CPU on a cell.

For KVM, we have implemented heuristics to calculate the available CPU bandwidth in MHz. The current heuristics assumes that no VCPU has affinity towards a physical CPU. Also, the power-saving modules on the cell can vary the CPU frequency based on workload. Our available CPU bandwidth calculations, take fluctuating CPU frequencies into account while calculating the available CPU bandwidth.

CPU Unit for shared allocations: Since the CPU frequency can vary from one host to another, we use standard unit for CPU allocation e.g. each CPU unit is 500 MHz of 1 processor.

Examples of Virtual Machine's CPU Requirements:

Discrete: minimum 4 cores & desired 6 cores with each core at least 1 GHz

Shared: minimum 4 CPU units & desired 6 CPU units.

Virtual Machine: Memory Requirement

A given virtual machine might have a need for say 8 GB RAM. In that case, we will need to look at the available capacity of each cell-block and decide which cell blocks are capable of meeting the virtual machine's memory requirement.

Allocation of memory falls into two broad categories based on the virtualization technology:

1. Discrete: Example: Solaris LDOMs where the memory chunks are exclusively allocated to each VM 2. Shared: Example: KVM, VMware where the same physical memory can be allocated to multiple VMs i.e. the physical memory can be over-committed to the virtual machines.

Allocating memory for discrete allocation is quite straightforward as we can allocate only the free memory chunks. Allocating memory for shared allocation will require more intelligence to refine the over-commitment such that there is a right balance of memory utilization and meeting the VM's Memory requirement. We use resource-monitoring & forecasting techniques to find the available Memory on a cell.

Example of virtual machine's Memory requirements: Discrete/Shared: minimum 6 GB & desired 8 GB.

Virtual Machine: IO & Storage Connectivity

A virtual machine can host applications that store their data into a persistent storage. Each fresh virtual machine could have storage tier requirement for its hosted applications e.g. a virtual machine might need access to tier1 storage. Also, a virtual machine could need a particular layout & size of LUNs from a particular storage tier.

Also, when a virtual machine is moved across cell blocks, it will need visibility to the LUNs used for its persistent data wherever it moves. One way to ensuring storage connectivity when a VM is moved across cells is to use current VOM & map-reduce kind of distributed heuristics to ensure LUN connectivity.

Also, there exists NPIV kind of technology that could be leveraged for this e.g. with NPIV, we can unmask LUNs to a particular WWWN. So, when the VM moves, we can also move the virtual HBA's WWWN & hence make the LUNs visible to the VM in its new home.

Also, technologies like SR-IOV & MR-IOV can be used to achieve this. The advantage of using SR-IOV is:

There is QOS associated with each HBA, no VM can hog all the bandwidth. The WWWN of the guest HBA is in the guest. This means as guest moves, storage follows.

Completely in hardware—you get native speeds. Also, there is no fabric change.

The disadvantage(s) is that: There is no man in the middle, therefore live migration is impossible. So, to enable live migration with SR-IOV, some solution is required. Some of the possible ways are: DMP can listen to device plug/unplug (PCI) quiesce I/O and be the first enabler of true wide scale live migration and clouds. OS will catch up eventually to provide this.

Alternate Approach

Have 2 paths, one SR-IOV one hypervisor based (virtio), tap into migration start event, failover to virtio, migrate and fail back to SR-IOV. For phase1, we will just look at storage tier connectivity. Example: VM's storage requirement—tier1 with 600 GB space Virtual Machine: Networking Requirements A virtual machine may need access to some networks, specific network bandwidth.

What is claimed is:

1. A computer-implemented method comprising:
   accessing, using one or more processors, a virtual machine (VM) configuration of a virtual machine, wherein
      the VM is to be hosted by a host node, and
      the VM configuration comprises one or more requirements that are necessary for hosting the VM;
   accessing a first cluster configuration of a first cluster, wherein
      an n-ary tree comprises a first leaf level and a second leaf level,
      the first leaf level comprises at least a root node of the first cluster,
      the second leaf level comprises a first plurality of potential nodes (second leaf nodes) of the first cluster,
      the first plurality of second leaf nodes are configured to host at least one VM, and
      the first cluster configuration comprises configuration information for one or more nodes of the first plurality of second leaf nodes, wherein
         each second leaf node of the one or more second leaf nodes generates configuration information corresponding to the each second leaf node; and
   comparing the configuration information corresponding to the each second leaf node with the VM configuration, wherein
      the each second leaf node performs the comparing with respect to itself,
      the comparing determines whether the each second leaf node is capable of satisfying the one or more requirements that are necessary for hosting the VM,
      the each second leaf node transmits a result of its respective comparison to the root node, and
      the result is one of a set of such results; and
   provisioning the VM to be hosted at one of the second leaf nodes, wherein
      the provisioning is based, at least in part, on the set of such results.

2. The method of claim 1, wherein
the one or more requirements comprise one or more security elements of the potential node in order to host the VM.

3. The method of claim 1, wherein
the VM configuration is comprised in a service level agreement (SLA) of the VM.

4. The method of claim 1, wherein
the one or more requirements comprise one or more security elements, wherein
   the one or more security elements comprise at least one of
      a list comprising one or more networks that the VM is permitted to access, and
      a requirement to scan the VM for one or more viruses at a predetermined interval of time.

5. The method of claim 1, wherein
the one or more requirements comprises one or more additional requirements, wherein
   the one or more additional requirements comprise
      one or more data protection requirements that indicate one or more data protection elements needed in a potential node in order to host the VM.

6. The method of claim 1, further comprising:
storing the VM configuration in a memory.

7. The method of claim 1, further comprising:
accessing a second cluster configuration of a second cluster, wherein
   the second cluster comprises a second plurality of potential nodes,
   the second plurality of potential nodes are configured to host at least one VM, and
   the second cluster configuration comprises configuration information for one or more nodes of the second plurality of potential nodes; and
comparing the VM configuration with the second cluster configuration.

8. The method of claim 7, further comprising:
selecting a selected cluster of the first cluster and the second cluster, wherein
   the selecting the selected cluster is based on one or more of
      the comparing the VM configuration with the first cluster configuration, or
      the comparing the VM configuration with the second cluster configuration.

9. The method of claim 5, wherein
the comparing the VM configuration and the first cluster configuration comprises determining whether the one or more additional requirements match one or more operational elements of the first plurality of potential nodes.

10. The method of claim 5, further comprising:
selecting a first host node of the first plurality of potential nodes; and
configuring the first host node in accordance with the one or more additional requirements.

11. The method of claim 1, further comprising:
hosting the VM at a first eligible node of the first cluster, wherein
the hosting is performed after the comparing the VM configuration and the first cluster configuration;
accessing the VM configuration of the VM;
determining one or more operational indicators, wherein
the one or more operational indicators indicate operational characteristics of one or more of
the first eligible node, or
the first cluster; and
comparing one or more operational elements and the one or more operational indicators.

12. The method of claim 11, further comprising:
accessing a first potential node of the first cluster;
accessing the VM configuration for one or more currently-hosted VMs that are hosted by the first potential node;
determining whether one or more of the currently-hosted VMs are operating within the respective operational characteristics, wherein
the determining whether one or more of the currently-hosted VMs are operating within the respective specified operational characteristics comprises
performing the accessing of the VM configuration for at least some of the one or more currently-hosted VMs,
performing the determining the operational indicators of the first eligible node, and
performing the comparing of the one or more operational elements and the operational indicators.

13. The method of claim 11, wherein
the comparing the one or more operational elements and the operational indicators is performed for at least a subset of the currently-hosted VMs.

14. The method of claim 11, wherein
the comparing the one or more operational elements and the operational indicators is performed in response to receiving a notification that at least one of the operational indicator(s) has changed.

15. The method of claim 11, wherein
the accessing the VM configuration of the VM comprises
accessing a database of a plurality of configuration information for a plurality of virtual machines (VMs),
the plurality of VMs are hosted by the first plurality of potential nodes in the first cluster, and
the plurality of VMs comprise the VM.

16. The method of claim 11, wherein
the accessing the VM configuration of the VM comprises
accessing a database of a plurality of configuration information for a plurality of virtual machines (VMs),
the plurality of VMs are hosted by the first plurality of potential nodes,
the first plurality of potential nodes are comprised in a plurality of clusters,
the plurality of VMs comprise the VM, and
the plurality of clusters comprise the first cluster.

17. The method of claim 11, wherein the comparing the VM configuration and the one or more operational indicators comprises
determining a deviation by performing an analysis, and
determining whether the deviation is within a range.

18. The method of claim 17, further comprising
in response to a determination that the deviation is outside the range, generating an alert.

19. The method of claim 17, wherein
the range is predetermined prior to the determining the deviation.

20. The method of claim 17, wherein
the range is dynamically determined.

21. The method of claim 11, wherein
the hosting of the VM is based on the VM configuration.

22. A system comprising:
one or more processors,
a first cluster configuration of a first cluster, wherein
an n-ary tree comprises a first leaf level and a second leaf level,
the first leaf level comprises at least a root node of the first cluster,
the second leaf level comprises a first plurality of potential nodes (second leaf nodes) of the first cluster,
the first plurality of second leaf nodes are operable to host at least one virtual machine (VM), and
the first cluster configuration comprises configuration information for one or more nodes of the first plurality of second leaf nodes, wherein
each node of the one or more nodes generates configuration information corresponding to the each second leaf node;
a VM configuration, wherein
the VM configuration comprises one or more requirements that are necessary for hosting the VM;
a comparison module, wherein
the comparison module is configured to compare the configuration information corresponding to the each second leaf node with the VM configuration, wherein
the each second leaf node is configured to perform a comparison of the VM configuration with the configuration information corresponding to itself,
the comparison determines whether the each second leaf node is capable of satisfying the one or more requirements that are necessary for hosting the VM,
the each second leaf node is configured to transmit a result of its respective comparison to the root node, and
the result is one of a set of such results, and
the comparison module is configured to be executed using the one or more processors; and
a provisioning module configured to provision the VM to be hosted at one of the second leaf nodes, wherein
the provisioning is based, at least in part, on the set of such results.

23. The system of claim 22, wherein
the one or more requirements comprise one or more additional requirements, wherein
the one or more additional requirements comprise one or more data protection requirements that indicate one or more data protection elements needed in a node in order to host the VM.

24. The system of claim 22, wherein
the comparison module is further configured to
compare the VM configuration and a second cluster configuration,
a second cluster comprises a second plurality of potential nodes,
the second plurality of potential nodes are configured to host at least one VM, and the second cluster configuration comprises configuration information for one or more of the second plurality of potential nodes.

25. The system of claim 24, further comprising:
a determination module, wherein
the determination module is configured to determine a cluster out of the first and second cluster, and
the determination module is configured to perform a determination based at least on
the comparison of the VM configuration with the first cluster configuration, and
the comparison of the VM configuration with the second cluster configuration.

26. The system of claim 23, wherein
the comparison module is configured to
determine whether the one or more additional requirements match one or more operational elements of the first plurality of potential nodes.

27. The system of claim 23, further comprising:
a selection module, wherein
the selection module is configured to
select a first eligible node of the first plurality of potential nodes; and
a configuration module, wherein
the configuration module is configured to
configure the first eligible node in accordance with the one or more additional requirements.

28. The system of claim 22, further comprising:
an operational indicator module, wherein
the operational indicator module is operable to determine one or more operational indicators,
the one or more operational indicators indicate operational characteristics of one or more of
a first potential node, or
the first cluster;
the first potential node is configured to host the VM after the comparison module compares the VM configuration with the first cluster configuration; and
the comparison module is further configured to compare one or more operational elements with the operational indicators of the first potential node.

29. The system of claim 28, further comprising:
a determination module, wherein
the determination module is configured to determine whether one or more of the VMs are operating within respective operating characteristics,
the operational indicator module is further operable to determine operational indicators of the first potential node, and
the comparison module is further operable to compare the one or more operational elements and the operational indicators of the first potential node.

30. The system of claim 28, further comprising:
a database, wherein
the database stores a plurality of configuration information for a plurality of virtual machines (VMs),
the plurality of VMs are hosted by the first plurality of potential nodes in the first cluster,
the first plurality of potential nodes are comprised in a plurality of clusters,
the plurality of VMs comprise the VM, and
the plurality of potential clusters comprise the first cluster.

31. The system of claim 28, further comprising:
a determination module, wherein
the determination module is operable to
determine an deviation by performing an analysis, and
determine whether the deviation is within a range.

32. A computer program product comprising:
a plurality of instructions, comprising
a first set of instructions, executable on a computer system, configured to
access a virtual machine (VM) configuration of a virtual machine, wherein
the VM is to be hosted by a host node, and
the VM configuration comprises one or more requirements that are necessary for hosting the VM,
a second set of instructions, executable on the computer system, configured to
access a first cluster configuration of a first cluster, wherein
an n-ary tree comprises a first leaf level and a second leaf level,
the first leaf level comprises at least a root node of the first cluster,
the second leaf level comprises a first plurality of potential nodes (second leaf nodes) of the first cluster,
the first plurality of second leaf nodes are configured to host at least one VM, and
the first cluster configuration comprises configuration information for one or more nodes of the first plurality of second leaf nodes, wherein
each second leaf node of the one or more second leaf nodes generates configuration information corresponding to the each second leaf node, and
a third set of instructions, executable on the computer system, configured to compare the configuration information corresponding to the each second leaf node with the VM configuration, wherein
the each second leaf node is configured to perform a comparison of the VM configuration with the configuration information corresponding to itself,
the comparison determines whether the each second leaf node is capable of satisfying the one or more requirements that are necessary for hosting the VM,
the each second leaf node is configured to transmit a result of its respective comparison to the root node, and
the result is one of a set of such results;
a fourth set of instructions, executable on the computer system, configured to provision the VM to be hosted at one of the second leaf nodes, wherein
the VM is provisioned, at least in part, based upon the set of such results; and
a non-transitory storage media, wherein the instructions are encoded in the non-transitory storage media.

33. The computer program product of claim 32, wherein
the one or more requirements comprise one or more additional requirements, wherein
the one or more additional requirements comprise
one or more data protection requirements that indicate one or more data protection elements needed in a potential node in order to host the VM.

34. The computer program product of claim 32, wherein
the instructions further comprise:

a fifth set of instructions, executable on the computer system, configured to access a second cluster configuration of a second cluster, wherein
the second cluster comprises a second plurality of potential nodes,
the second plurality of potential nodes are configured to host at least one VM, and
the second cluster configuration comprises configuration information for one or more of the second plurality of potential nodes; and
a sixth set of instructions, executable on the computer system, configured to compare the VM configuration with the second cluster configuration.

35. The computer program product of claim 33, wherein the instructions further comprise:
a fifth set of instructions, executable on the computer system, configured to select a first host node of the first plurality of potential nodes; and
a sixth set of instructions, executable on the computer system, configured to configure the first host node in accordance with the one or more additional requirements.

36. The computer program product of claim 32, wherein the instructions further comprise:
a fifth set of instructions, executable on the computer system, configured to host the VM at a first eligible node of the first cluster, wherein
the hosting is performed after the comparing the VM configuration and the first cluster configuration;
a sixth set of instructions, executable on the computer system, configured to access the VM configuration of the VM;
a seventh set of instructions, executable on the computer system, configured to determine one or more operational indicators, wherein
the one or more operational indicators indicate operational characteristics of one or more of
the first eligible node, or
the first cluster; and
an eighth set of instructions, executable on the computer system, configured to compare one or more operational elements and the one or more operational indicators.

37. The computer program product of claim 36, wherein the instructions further comprise:
a ninth set of instructions, executable on the computer system, configured to access a first potential node of the first cluster;
a tenth set of instructions, executable on the computer system, configured to access the VM configuration for one or more currently-hosted VMs that are hosted by the first potential node;
an eleventh set of instructions, executable on the computer system, configured to determine whether one or more of the currently-hosted VMs are operating within the respective operational characteristics, wherein
determining whether one or more of the currently-hosted VMs are operating within the respective specified operational characteristics comprises
accessing the VM configuration for at least some of the one or more currently-hosted VMs,
performance of the determining the operational indicators of the first eligible node, and
performance of the comparing of the one or more operational elements and the operational indicators.

38. The computer program product of claim 36, wherein the comparison of the one or more operational elements and the operational indicators performed in response to receiving a notification that at least one of the operational indicator(s) has changed.

39. The computer program product of claim 36, wherein the instructions further comprise:
a ninth set of instructions, executable on the computer system, configured to determine an deviation by performing an analysis; and
a tenth set of instructions, executable on the computer system, configured to determine whether the deviation is within a range.

40. The computer program product of claim 36, wherein the hosting of the VM is based on the VM configuration.

* * * * *